(12) United States Patent
DeHaven et al.

(10) Patent No.: US 9,400,847 B1
(45) Date of Patent: Jul. 26, 2016

(54) METHOD AND SYSTEM FOR PAGINATION OF CONTENT

(75) Inventors: Michael Lee DeHaven, Cedar Park, TX (US); Brent Hayden Thomas, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 540 days.

(21) Appl. No.: 13/362,161

(22) Filed: Jan. 31, 2012

(51) Int. Cl.
*G06F 17/00* (2006.01)
*G06F 17/30* (2006.01)

(52) U.S. Cl.
CPC .................. *G06F 17/3089* (2013.01)

(58) Field of Classification Search
CPC .................................................. G06F 17/3089
USPC ........................................................ 715/205
See application file for complete search history.

(56) References Cited

U.S. PATENT DOCUMENTS

| | | | |
|---|---|---|---|
| 5,528,490 A | 6/1996 | Hill | |
| 5,761,649 A | 6/1998 | Hill | |
| 5,999,908 A | 12/1999 | Abelow | |
| 6,029,142 A | 2/2000 | Hill | |
| 6,236,994 B1 | 5/2001 | Swartz et al. | |
| 6,757,682 B1 | 6/2004 | Naimark et al. | |
| 6,785,671 B1 | 8/2004 | Bailey et al. | |
| 6,999,962 B2 | 2/2006 | Julliard et al. | |
| 7,133,834 B1 | 11/2006 | Abelow | |
| 7,143,089 B2 | 11/2006 | Petras et al. | |
| 7,222,078 B2 | 5/2007 | Abelow | |
| 7,428,496 B1 | 9/2008 | Keller et al. | |
| 7,620,565 B2 | 11/2009 | Abelow | |
| 7,620,651 B2 | 11/2009 | Chea et al. | |
| 7,908,173 B1 | 3/2011 | Hill | |
| 7,908,176 B1 | 3/2011 | Hill | |
| 7,930,363 B2 | 4/2011 | Chea et al. | |
| 7,937,391 B2 | 5/2011 | Chea et al. | |
| 2002/0112035 A1 | 8/2002 | Carey et al. | |

(Continued)

FOREIGN PATENT DOCUMENTS

| | | |
|---|---|---|
| WO | WO2007047691 | 4/2007 |
| WO | WO2007050234 | 5/2007 |
| WO | WO2007059096 | 5/2007 |

OTHER PUBLICATIONS

International Search Report and Written Opinion of the International Searching Authority for International Patent Application No. PCT/US2011/059395, mailed Apr. 3, 2012, 8 pgs.

(Continued)

*Primary Examiner* — Mustafa Amin
(74) *Attorney, Agent, or Firm* — Meyertons, Hood, Kivlin, Kowert & Goetzel, P.C.

(57) ABSTRACT

Embodiments of methods and systems for incorporating user generated content into a web page are disclosed. Certain embodiment may allow a different amount of user-generated content to be incorporated into a set of web pages associated with the same product. More particularly, according to one embodiment, a first amount of user-generated content can be presented on an initial web page associated with the product and a different amount of user generated content can be presented on subsequent pages. Moreover, in other embodiments, differing sort orders may be utilized in conjunction with the initial web page and subsequent pages with the result that the user-generated content is incorporated into the initial web page according to a first sort order and user generated content is incorporated into subsequent web pages according to a different sort order.

21 Claims, 34 Drawing Sheets

(56) References Cited

U.S. PATENT DOCUMENTS

| | | | |
|---|---|---|---|
| 2002/0165905 A1 | 11/2002 | Wilson | |
| 2005/0044197 A1 | 2/2005 | Lai | |
| 2006/0069564 A1 | 3/2006 | Allison et al. | |
| 2006/0212451 A1* | 9/2006 | Serdy et al. | 707/10 |
| 2007/0078833 A1 | 4/2007 | Chea et al. | |
| 2007/0112760 A1 | 5/2007 | Chea et al. | |
| 2007/0169096 A1 | 7/2007 | Chea et al. | |
| 2007/0174247 A1 | 7/2007 | Xu et al. | |
| 2007/0192155 A1 | 8/2007 | Gauger | |
| 2007/0244888 A1 | 10/2007 | Chea et al. | |
| 2008/0059348 A1* | 3/2008 | Glassman | G06Q 30/02 705/35 |
| 2008/0244431 A1 | 10/2008 | Chea et al. | |
| 2009/0037412 A1 | 2/2009 | Bard et al. | |
| 2009/0320119 A1 | 12/2009 | Hicks et al. | |
| 2010/0114883 A1 | 5/2010 | Chea et al. | |
| 2011/0004850 A1* | 1/2011 | Lodico | G06Q 30/02 715/838 |
| 2011/0040622 A1* | 2/2011 | Lucovsky et al. | 705/14.49 |
| 2012/0005686 A1* | 1/2012 | Rajan | G06F 17/2241 718/105 |
| 2012/0117459 A1 | 5/2012 | DeHaven et al. | |
| 2012/0124463 A1 | 5/2012 | DeHaven et al. | |
| 2012/0158735 A1* | 6/2012 | Ruhl et al. | 707/741 |

OTHER PUBLICATIONS

Harry, David, "How Content Syndication Can Backfire," in the Fire Horse Trail (online), Jun. 7, 2010, retrieved on Mar. 8, 2012 at http://www.huomah.com/Search-Engines/Search-Engine-Optimization/How-Content-Syndication-Can-Backfire.html, p. 2, para 1-3, 9 pgs.

"You're It," a blog on tagging at http://www.tagsonomy.com/, printed Dec. 12, 2007, 13 pgs.

Arrington, Michael "Profile: DinnerBuzz," Jun. 2005, 4 pgs., at http:///www.techcrunch.com/2005/07/03/profile-dinnerbuzz/, printed on Dec. 12, 2007.

AdamNation tagging blog posted on Jul. 28, 2005 at http://adam.easyjournal.com/entry.aspx?eid=2632426 printed on Dec. 12, 2007, 5 pgs.

PeerPressure >> Scrumptious blog, dated Mar. 22, 2005, at http://www.allpeers.com/blog/?page_id=71, printed Dec. 12, 2007, 19 pgs.

Golder, Scott A. and Huberman, Bernardo A., "The Structure of Collaborative Tagging Systems," Information Dynamics Lab, HP Labs, Aug. 18, 2005, 8 pgs.

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academiccommons.org/commons/essay/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs, In WWW2006: Proceedings of the Collaborative Web Tagging Workshop, 2006.

* cited by examiner

Shop with Confidence

100% SATISFACTION GUARANTEE
LIFETIME RETURNS

Shop with confidence knowing we've got your back with our 100% Satisfaction Guarantee and no-questions-asked Lifetime Returns.

Description

Made with classic Oxford lace styling, Keen's Presidio shoe gives you refined casual comfort in a look that doesn't have any of the floral print found on the summer-oriented Zoe Oxford lace shoe. Along the interior collar you'll find a synthetic leather lining and moisture-wicking fabric further inside for all-day comfort. The metatomical footbed easily conforms to most feet, but you can remove the footbed and use your own custom orthotics. This is a great casual shoe for times around the house and those easy-going brainstorming sessions at work.

Watch the Video

Specifications
- Upper: water resistant leather
- Classic Oxford lace design with metal eyelets and wide laces
- Lining: moisture-wicking, consists of smooth leather and synthetic materials
- Comfortable metatomical footbed can be removed and replaced with custom orthotic support
- Patented toe protection
- Outside: non-marking rubber high traction with moderate profile tread for grip on varied terrain
- Fit tip: we find this style runs pretty true to size
- Weight: 11 oz, 313 g
- Watch the Video

[WRITE A REVIEW]  [Featured Reviews]

★★★★★
comfortable shoe

January 13, 2010

Anonymous

I had to order a half size less than usual. I am normally a 7, but needed a 6.5 in this shoe.
Keen shoes last awhile 👍 0  👎 0  ⊘ Report  Share this Review: [f][≋][▦][t]

★★★★★
Great Support

January 5, 2010

Anonymous

I have had back problems for while and it is hard to find a pair of shoes that feel great and give great support! The presidio gives both! I have owned other keens and they always last so well! I am looking forward to having these around for a while!

👍 0  👎 0  ⊘ Report  Share this Review: [f][≋][▦][t]

1  2  3  next

[Clothes]  [Shoes]  [Gear]  [Brands]

All orders to AUSTIN, TX ship FREE

*FIG. 5A-2*

Keen Women's Presidio Shoe Reviews Page 2

[WRITE A REVIEW]  [Featured Reviews ▼]

★★★★★
Keen Shoes
📅 March 12, 2011

| 👤 Joyan |

Excellent wide fit. Nice color, though at first I thought it was worn. I guess that's just how it's made. The workmanship is good and I believe will last a long time. Comfort is A-class and will work well for people with fallen arches....Good support and all-day wear.

👍 0   👎 0   ⊘ Report        Share this Review: [f][⋮][▦][t]

★★★★★
Keen Presidio
📅 January 15, 2012

| 👤 Tallendds
     Age: 35-44 |

These are extremely comfortable shoes. The fit is true to size. I am on my feet all day with no discomfort! I would highly recommend these shoes and Altrec.

👍 0   👎 0   ⊘ Report        Share this Review: [f][⋮][▦][t]

★★★★☆
I can stand all day with these shoes on.
📅 May 28, 2008

| 👤 Anonymous |

I have a couple pair of the Timberlines, and a pair of the Chamonix clogs and really love the fit, and although I don't feel these shoes have the same arch support the cushioned heel makes them comfortable to wear all day long. I will continue to buy more Keen footwear.

👍 0   👎 0   ⊘ Report        Share this Review: [f][⋮][▦][t]

*FIG. 5B-2*

★★★★★
Love these shoes!
May 24, 2008

Anonymous

These shoes fit great and are very comfortable. I am taking them to England where I plan on doing some serious walking!

👍 0  👎 0   ⊘ Report                                    Share this Review: [f] [📧] [▨] [t]

★★★★★
gimme 5 of each!
May 09, 2008

Anonymous

Yow! the comfort is like slippers. I forget to change when I get home, they are so yummy. I want a pair in every color & style;wish I'd discovered the comfort of Keens years ago! I have the Chamonix boots (people comment when I wear them always). The presidios: I will order in every color. My last years' clogs: my 1st pair of Keens; I'll never give them up!!

👍 0  👎 0   ⊘ Report                                    Share this Review: [f] [📧] [▨] [t]

prev  1  2  3  next

[ Clothes ⇅ ]   [ Shoes ⇅ ]   [ Gear ⇅ ]   [ Brands ⇅ ]

All orders to AUSTIN, TX ship FREE

*FIG. 5B-3*

Shop with Confidence

100% SATISFACTION GUARANTEE
LIFETIME RETURNS

Shop with confidence knowing we've got your back with our 100% Satisfaction Guarantee and no-questions-asked Lifetime Returns.

Description

Made with classic Oxford lace styling, Keen's Presidio shoe gives you refined casual comfort in a look that doesn't have any of the floral print found on the summer-oriented Zoe Oxford lace shoe. Along the interior collar you'll find a synthetic leather lining and moisture-wicking fabric further inside for all-day comfort. The metatomical footbed easily conforms to most feet, but you can remove the footbed and use your own custom orthotics. This is a great casual shoe for times around the house and those easy-going brainstorming sessions at work.

Watch the Video

Specifications
- Upper: water resistant leather
- Classic Oxford lace design with metal eyelets and wide laces
- Lining: moisture-wicking, consists of smooth leather and synthetic materials
- Comfortable metatomical footbed can be removed and replaced with custom orthotic support
- Patented toe protection
- Outside: non-marking rubber high traction with moderate profile tread for grip on varied terrain
- Fit tip: we find this style runs pretty true to size
- Weight: 11 oz, 313 g
- Watch the Video

[WRITE A REVIEW]  [Newest]

★★★★★
Keen Presidio

January 15, 2012

Tallendds
Age: 35-44

These are extremely comfortable shoes. The fit is true to size. I am on my feet all day with no discomfort! I would highly recommend These shoes and Altrec.

👍 0   👎 0   ⊘ Report    Share this Review: [f][🔗][■][t]

★★★★☆
Keen Presidio

December 27, 2011

Yooper1708

Shoe fit well, but I returned them because the colors were not really as pictured. Found the actual shoe color was hard to match up with other items. Just seemed to be an off color.

Pros
fit well/true to size

👍 0   👎 0   ⊘ Report    Share this Review: [f][🔗][■][t]

1  2  3  next

[Clothes]  [Shoes]  [Gear]  [Brands]

All orders to AUSTIN, TX ship FREE

*FIG. 5C-2*

Keen Women's Presidio Shoe Reviews Page 2

[ WRITE A REVIEW ]   Most Helpful

★★★★★

February 11, 2011 allsfair
from Sierra foothills Age: 55-64

I'm sold on the comfort of Keen shoes. I own Targhee boots, sandals and the Presidio. I wear an 8 and need a little more width at the toes. The Presidio fits perfectly. These are the shoes I wear when I go geocaching. I don't always know where these caches are placed. The terrain can change from a paved road to a climb up a rocky embankment or at a muddy lake's edge. I like the leather uppers because it protects my feet, and it keeps my feet warm and dry in the rain or snow. The one draw-back is the outer sole at the heel wore down after wearing them for 2 years. Other than this, the shoes still look good and it's very comfortable. I bought a new pair in the same color.

Comfort

Durability

Quality

Pros:
Build quality, Great value
Cons:
Wears quickly

👍 2  👎 0   ⊘ Report                     Share this Review:

★★★★☆
Great shoe for all day wear

July 30, 2011 pwrbecks
From Miami, FL Age: 45-54

This is my first pair of KEEN shoes, (not sandals) I was looking for a comfortable shoe to wear at work, as well as while traveling. I was able to wear these all day right out of the box no break in period required. They are a little heavier than I would have liked, but they are very comfortable, good arch support, I normally have to exchange insoles on shoes and the factory insoles fit perfectly. I did get a 1/2 size larger, I'm 5'2", normally wear a 7 and I got a 7.5

Pros:
very comfortable, great quality and materials
Cons:
a little heavier than expected 👍 1  👎 0   ⊘ Report                     Share this Review:

*FIG. 5D-2*

★★★★★                                                    Featured
Keen Shoes
March 12, 2011

Joyan

Excellent wide fit. Nice color, though at first I thought it was worn. I guess that's just how it's made. The workmanship is good and I believe will last a long time. Comfort is A-class and will work well for people with fallen arches....Good support and all-day wear.

0   0   Report                                        Share this Review:

★★★★★
Keen Presidio
January 15, 2012

Tallendds
Age: 35-44

These are extremely comfortable shoes. The fit is true to size. I am on my feet all day with no discomfort! I would highly recommend these shoes and Altrec.

0   0   Report                                        Share this Review:

★★★★☆
Keen Presidio
January 15, 2012

Yooper1708

Shoe fit well, but I returned them because the colors were not really as pictured. Found the actual shoe color was hard to match up with other items. Just seemed to be an off color.

Pros:
fit well/true to size 0   0   Report                                        Share this Review:

prev 1 2 3 next

Clothes    Shoes    Gear    Brands

All orders to AUSTIN, TX ship FREE

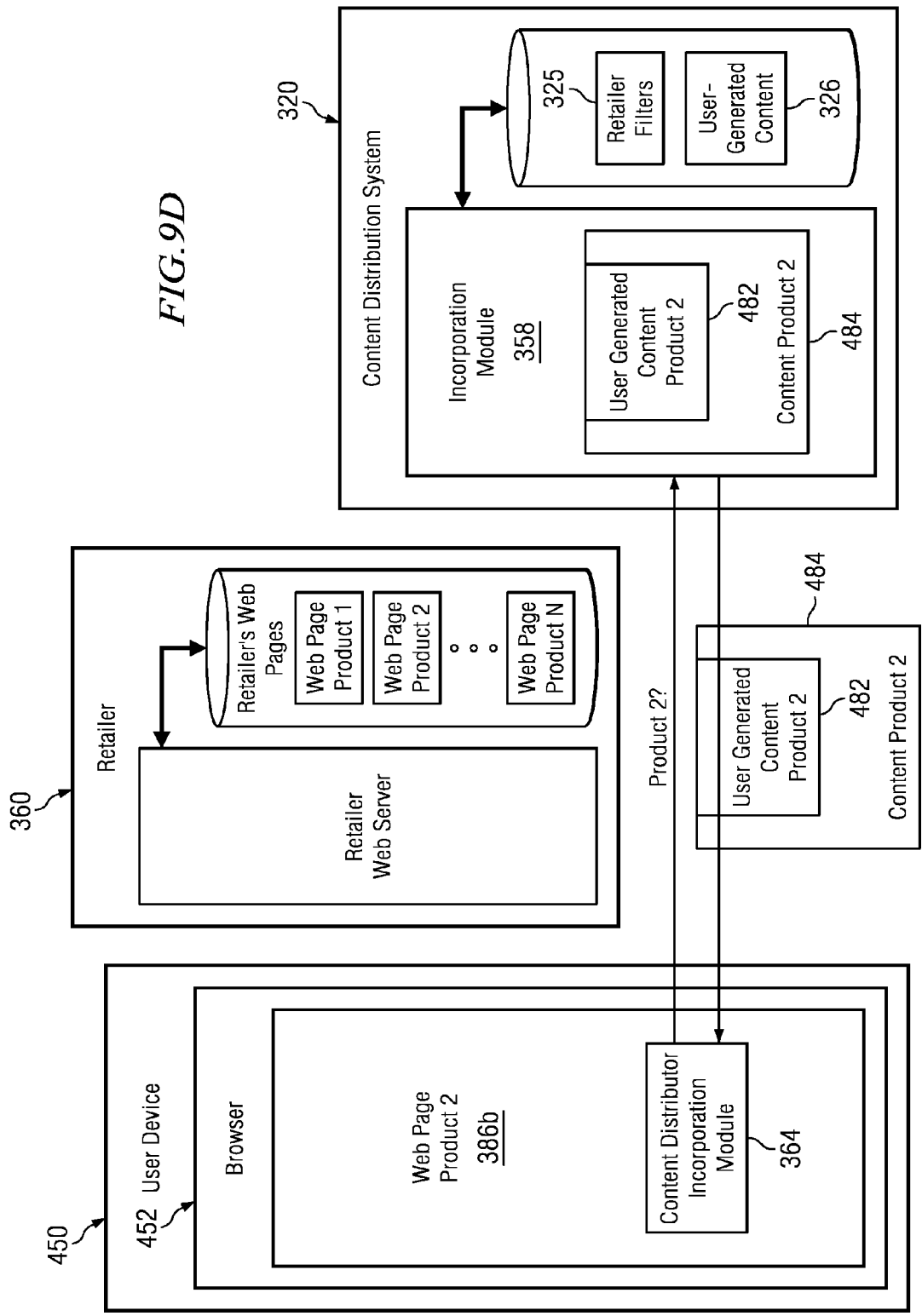

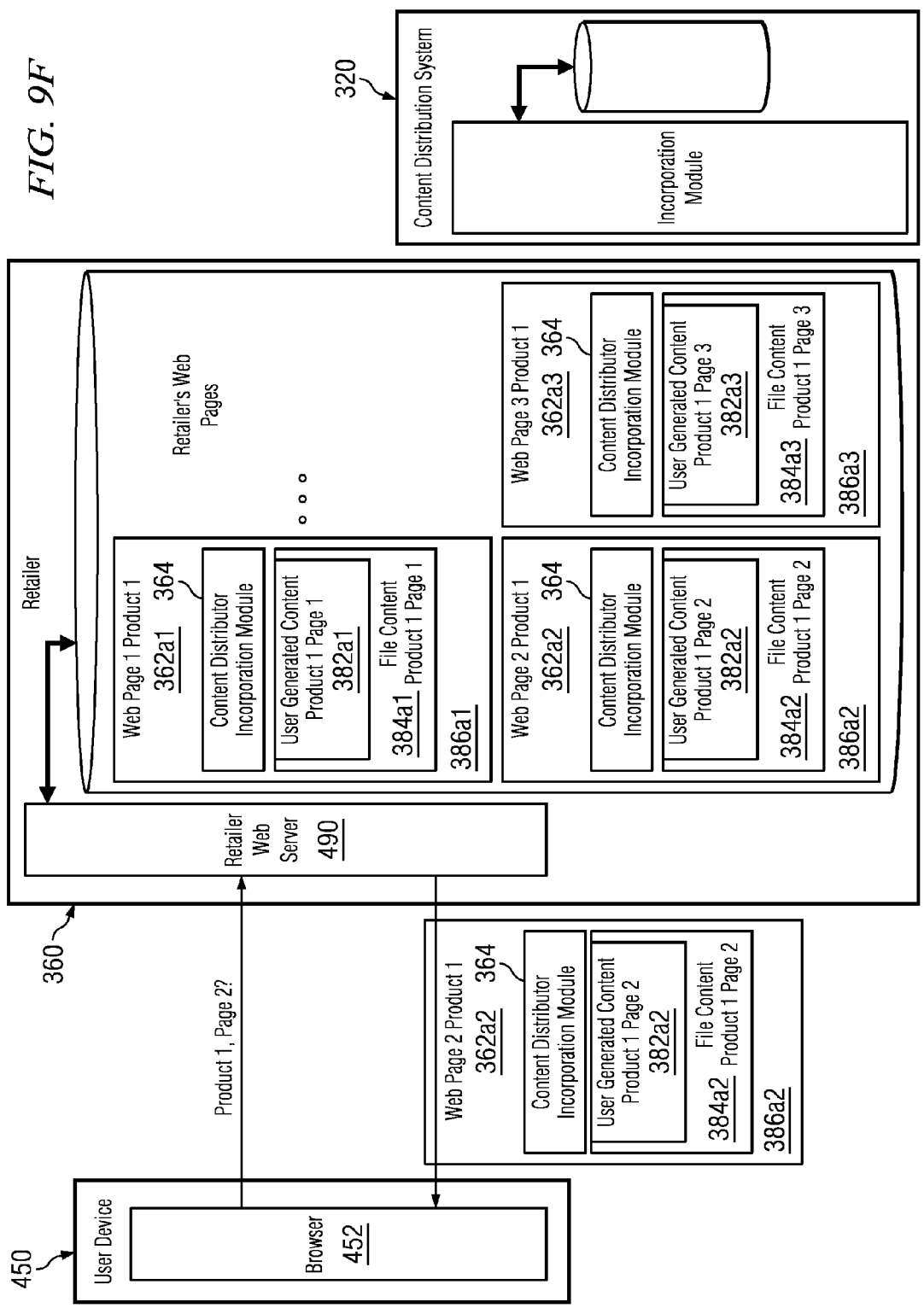

FIG. 11A-1

Rosetta Stone® Reviews http://www.rosettastone.com/reviews/Italian/Level-1-2-3-4-5 osettaStone  1.800.767.3882

ROSETTA STONE RATINGS AND REVIEWS

Rosetta Stone Italian
Level 1, 2, 3, 4 & 5 Set Reviews (67 reviews)

The Complete Italian set will enable you to fully express your ideas and opinions in Italian and master the conversational skills required to plan adventures, care for your health, and move abroad.

[LEARN MORE]

Italian Level 1, 2, 3, 4 Ramp; 5 4 7 5 67 67
Great Product! I bought this course knowing no Italian. Now after 3 months and having finished the course I can easily say that I speak Italian. It may not be fluent but I can communicate very well and understand, almost perfectly. Even though I do know 3 other Romance Languages (which probably helped me a lot) I think that anyone who bought this product and dedicated themselves to it, will have a wide knowledge and communicative skills by the end of the course. October 3, 2011.
4.5 stars. Maybe this is because I've already had experience with a Romance Language, but this program was excellent in helping me learn Italian. Though I've been using this program for less than a year I can already communicate in Italian (nearly) the same breadth of topics as I can my second language, Spanish. Though tedious at times, the repetition really helps me to become effective at memorizing the words and what they mean. I was reading through some Italian textbooks the other day and found I could understand the material in the lessons when I've never even used such materials. I'm just starting with Unit 4 and am already so impressed with the amount of information I'm learning. Once I finish with all of the lessons I'm going to review all of the stories and play all of the games until the language moves like butter through my mind. To attain fluency, however, I'm going to have to try different methods for memorizing mass amounts of words and concepts. However, I enthusiastically recommend this program to any desiring to learn the language. It is without a doubt the best purchase I've ever made. July 13, 2011.

link:http://www.fluentin3months.com

SELECT A LANGUAGE

SELECT A LEVEL

Try Our Free Online Demo

Interactive  Live Online  Games &    Mobile      Headset with
Software    Lessons      Community  Companion™  Microphone

[GET STARTED]

Shop Now At Rosetta Stone
Learn more about Rosetta Stone Italian
Choose from more than 30 languages spoken in 150 countries.

[SHOP NOW]

[JOIN THE CONVERSATION]

Good but not perfect. Rosetta Stone is a very good product but one that needs much improvement. You cannot rely on this software to be the only source for learning Italian. You will need other materials, (books or software), to assist you. On the plus side, Rosetta Stone is effective in building word association. If you can look at a cat and think "Gatto" then you know that you've learned something that will stick with you. The more you build your vocabulary, the better. Where it fails and thus needs serious improvement is the lack of verb explanation. If Rosetta Stone added a section to the software that dealt with understanding verbs and their usage, that would make this product almost perfect. I've had to go back and forth from either an internet language forum or a book to understand why and when the verb i.e. "Fare" changes to "fara". Rosetta Stone should have provided this information and by not providing it, the lessons can be confusing. Only the most tenacious student will be committed enough to search out information independently of the Rosetta Stone software. It's no wonder why those who give Rosetta Stone a negative review are easily tripped. You cannot solely rely on this program. The lack of essential information is inexcusable. I will continue on with Rosetta Stone and I'm sure I will find other issues as I go along. Since I am committed to learning the language, I know going forward that Rosetta Stone will not be the only learning tool that I'll need. I would give this software a mixed review. It's worth having, but be cautioned, you'll need other materials and lots of dedication to stick with your goal. Also important to keep in mind, I've yet to find any language software that is one hundred percent perfect. My observation however is not an excuse for Rosetta Stone's failings. They could have and should have done better as they claim that they are the best in the market when in fact they are only a notch above the better programs. A little more effort would have gone a long way. Hopefully future versions will incorporate improvements suggested by customers. I give it Three Stars. April 20, 2011.
Excellent program. This program is excellent. Using no native language, it really does teach you a new language the way you learned your first language. Just stick with it. April 16, 2011.
Good experience. I enjoy this program, which means I use it more. I like the audio and iPhone app as well. The different components make it accessible in different places, which means more use. I'm glad I bought all 5 levels, as at the end of parts 1 and 2 (the latest one I finished) I was definitely wanting more. April 16,

*FIG. 11A-2*

| *FIG.* | *FIG.* |
| *11B-1* | *11B-2* |

*FIG. 11B*

★★★★☆
4.5 stars
July 13, 2011
By JOELrk
from Buffalo, NY

Was this review helpful to you?
yes | no | inappropriate

Maybe this is because I've already had experience with a Romance Language, but this program was excellent in helping me learn Italian. Though I've been using this program for less than a year I can already communicate in Italian (nearly) the same breadth of topics as I can my second language, Spanish. Though tedious at times, the repetition really helps me to become effective at memorizing the words and what they mean. I was reading through some Italian textbooks the other day and found I could understand the material in the lessons when I've never even used such materials. I'm just starting with Unit 4 and am already so impressed with the amount of information I'm learning. Once I finish with all of the lessons I'm going to review all of the stories and play all of the games until the language moves like butter through my mind. To obtain fluency, however, I'm going to have to try different methods for memorizing mass amounts of words and concepts. However, I enthusiastically recommend this program to any desiring to learn the language. It is without a doubt the best purchase I've ever made.

Number or Rosetta Stone products owned: 1
Next language to learn: French
Reason for learning this language: Self-improvement
Previous experience in this language: none

*FIG. 11B-2*

METHOD AND SYSTEM FOR PAGINATION OF CONTENT

TECHNICAL FIELD

This disclosure relates generally to the distribution and inclusion of content. In particular, this disclosure relates to the distribution and inclusion of content in a web page. Even more specifically, this disclosure relates to the distribution and inclusion of user-generated content in a web page in such a manner that content better tailored to a user's desires may be displayed to the user and the exposure of such web pages with respect to certain search engines is increased.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially ratings and reviews, but also general information. In the context of advertising and marketing, the use of word of mouth may mean passing information between consumers or other entities, including manufacturers, experts, retailers, etc. to convey aspects or merits of a product or service, or the experience one person has related to that product or service, or related products or services.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouth marketing.

This view has been widely reinforced by many operators of web sites including, for example, retailers (retailers will be used herein to refer to any type of seller, manufacturer, or any other entity involved in the lifecycle of a product or service, for example both online and brick and mortar) who report that products with relatively more reviews sell better and are returned less often.

Thus, it is desirable that user generated content be included in web pages in a manner such that the user generated content will be displayed in a fashion desired by users and the exposure of those web pages on which the user generated content is included will be increased.

SUMMARY

As discussed, user-generated content (comprising any information such as text, audio, video, or other information carrying medium generated by a user who is a consumer (of goods, a product, website, service, purchaser of the product, etc.)) may be extremely important to manufacturers, retailers or other sellers of a product or service (collectively referred to herein as a product) as user-generated content may allow products to be differentiated and sales of products increased. This user-generated content may include such things as user reviews, user stories, ratings, comments, problems, issues, question/answers, or other type of content which, for example, a user is allowed to compose or submit through any medium.

Accordingly, in most cases, in web pages of a commerce enabled web site there are generally two types of written content: 1) descriptive content, which is typically in paragraph form and 2) supporting content such as user generated content, which may be, for example, displayed in list form. A significant amount (e.g. on the order of thousands of pieces) of user-generated content may exist for about a single topic or product. For a variety of reasons it is less than desirable to present all this user-generated content on an initial page. One of these reasons is that it is desired to present a balance between descriptive content and supporting content on an initial page, as it has been determined that such a balance drives conversion (e.g. product purchases). Additionally, the presence of such a large amount of supporting content would make the web page lengthy and unwieldy and would serve to overwhelm web sites descriptive content (with respect to a search engine indexer) expressly designed to drive traffic to that web page.

Consequently such user-generated content may be presented in multiple pages. To implement these pages, in most cases, an initial page with an initial set of user-generated content is displayed (e.g. page 1). An event such as the clicking of a pagination link etc. must then occur to activate loading of additional user generated content (e.g. page 2, 3, etc.). Traditionally, the amount of content loaded on each web page is identical. For example, if page 1 has six pieces of user generated content (e.g. six reviews) pages 2, 3, 4, etc. would also have six pieces of user generated content (or less, for example, if the number of reviews associated with a product was not evenly divisible by six).

This traditional pagination is undesirable for a variety of reasons. First and foremost, traditional pagination provides an unsatisfactory user experience. A user's indication that he wishes to see additional user-generated content is also usually indicative that a user is interested in performing more in-depth "research" on the product by perusing more user-generated content. Thus, providing the user with the same amount of user generated content on a subsequent page as the user viewed on the initial page may frustrate the user's desire by requiring the user to interact with the web pages multiple times to view a desired amount of user-generated content. The purpose of the initial page, therefore, is to encourage conversion (e.g. purchase of the product) while subsequent pages may be designed to facilitate research. It would therefore be desirable to utilize the user's indication on an initial page that he wishes to view more content (e.g. an event indicating the user wishes to view more user-generated content) to present different amount of user-generated content on subsequent pages.

Traditional pagination may also have less than desirable qualities when it comes to search engine indexers. In many cases, operators of web sites that comprise web pages with such user generated content may desire to expose such web pages through web based search engines (e.g. Google, Bing, Yahoo, etc.). Such search engines may utilize a search engine indexer (also referred to as a web crawler, ant, automatic indexer or indexer, bot, web spider or spider, web scutter, etc.) to navigate through web pages on the internet to index information associated with the web pages through algorithmic analysis of such information. Using the created indices then, links to a set of web pages may be presented to a user as a result of a search comprising one or more terms. The links may be presented in order according to a ranking based on information in the indices.

The user generated content included in a retailer's or manufacturer's web sites, as discussed above, may include a variety of content (e.g. terms, etc.) that would be indexed by a search engine indexer and that could result in a particular web page that includes such user generated content receiving a higher ranking and thus being exposed as a result of a search or being more highly ranked and thus exposed, for example, on a first page of search results, etc.

Traditional pagination, however, as noted above, may present the same amount of user generated content on each web page. In addition, such traditional pagination may sometimes present duplicate content on different pages. This duplicative content includes descriptive content (e.g. associated with a product) that may be presented on each of the different pages. Moreover, in some cases traditional pagination may result in the presentation of duplicative user-generated content. In other words, the same user-generated content presented on an initial page may be duplicated on a subsequent page presented to a user when the user indicates he wants to see more user-generated content. These factors may contribute to the different web pages associated with a product or topic (e.g. the initial page and any subsequent pages used to present additional user-generated content) being grouped as a single page by a search engine indexer.

Such a grouping may result because search engine indexers may include algorithms that group pages based on duplicative content. Thus, if the same amount of descriptive content is included on each page and some user-generated content is duplicated among the web pages it may result in the search engine indexer counting those distinct pages as a single page. Even if the descriptive content is not included on subsequent pages the ratio of duplicative content to new content may result in pages being grouped as a single page. As retailers may desire that each web page of their site be indexed individually to increase the exposure of the web pages of the site it is therefore desirable to present user-generated content on the web pages associated with a product or topic in a manner that would facilitate those web pages being indexed individually.

Accordingly, attention is now directed to embodiments of the system and methods presented herein which allow a different amount of user-generated content to be incorporated into the set of web pages associated with the same product, category, topic, etc. (discussed collectively herein using the term product). More specifically, according to one embodiment, a first amount of user-generated content can be presented on an initial web page associated with the product and a different amount of user generated content can be presented on subsequent pages. Moreover, in other embodiments, differing sort orders may be utilized in conjunction with the initial web page and subsequent pages with the result that the user-generated content is incorporated into the initial web page according to a first sort order and user generated content is incorporated into subsequent web pages according to a different sort order. In this manner, the amount of user-generated content to be presented on each web page associated with a product (and thus the number of web pages in which such user generated content is incorporated) can be appropriately tailored such that they are both more valuable to users and consumed in a more desirable manner by search engine indexers.

In one particular embodiment, a method for distributing generated content is provided where an initial amount of generated content and a link to a subsequent web page on an initial web page is provided and a subsequent amount of generated content is provided on a subsequent web page in response to the activation of the link, wherein the second amount of user generated content is greater than the first amount of generated content.

The initial web page and the subsequent web page may be associated with the same product or category and may be part of the same web site. Additionally, in some embodiments, the initial amount of generated content is selected from a set of generated content sorted according to an initial sort order and the subsequent amount of generated content is selected from the set of generated content sorted according to a subsequent sort order.

Certain embodiments may be utilized at a content distribution system. For example, generated content associated with the product or category may be received at a content distribution system. The content distribution system may provide an initial amount of generated content to a web site where it is incorporated into the source code of an initial web page. Subsequently the content distribution system may receive a request for content associated with the initial web page from a browser rendering the initial web page at a user computer. In response the content distribution system may provide an initial amount of generated content to the browser at the user computer. The initial amount of generated content incorporated into the initial web page may be overwritten with the initial amount of user generated content provided in response to the request in a display of the web page. The incorporated initial amount and the provided initial amount may be the same (for example, same content, same amount, etc.) or may be different.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 5A-5F are examples of rendered web pages that present content according to embodiments described herein.

FIGS. 9B-9F are block diagrams of embodiment of the inclusion of content.

DETAILED DESCRIPTION

Figure 1B:
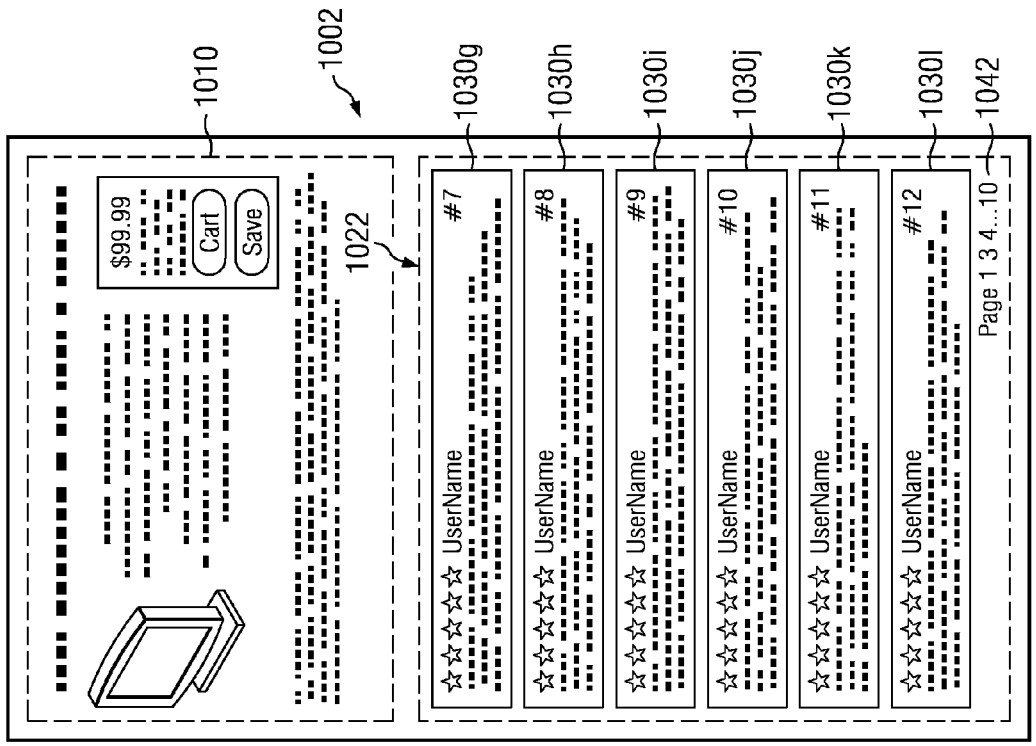
FIGS. 1A and 1B are graphical depictions of an embodiment of the pagination of content.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief overview of the context of the disclosure may be helpful. As discussed above the generation, distribution and use of user-generated content is increasingly important in the modern marketplace. User-generated content may include content generated or found on a web site (such as a manufacturer's site or other retailer's site) and presented user-generated content may be seamlessly integrated, so the consumer cannot tell whether the reviews came from the manufacturer or another web site. Alternatively, this integrated content may be identifiable by the consumer as being sourced from the manufacturer or other retailer or the content may be segregated and clearly denoted as being sourced from the manufacturer or retailer.

One example of user-generated content is what is referred to as question/answer content. This type of content may actually be generated by two (possibly distinct) users, a first user who generates a question to which he wishes to obtain the answer and one or more second users who generate an answer to this question. The question and the corresponding answers may be displayed to users which may help to drive increased sales of a product or increased traffic at a retailers or manufacturer's site.

Another example of user-generated of content is a review. A review may comprise a body in which the user may be allowed to give, for example, a free form text evaluation of a product, category, brand, etc.; a rating for the product or aspects of the product (four out five stars, 7 out of 10, etc.); pros or cons of the product; a descriptor such as a category or keyword to be associated with the product or other information. These reviews may be displayed to users in conjunction with a product, category, brand, etc. to aid in a user's purchasing decision with respect to a product.

If consumers can find a wider variety of reviews or other types of user-generated content at their favorite retailer site they may be enabled to research and buy in one place. As a result, consumers may not have to rely on a salesperson at a store to provide information. They can read about tests conducted by expert reviewers, get product specifics from the manufacturer, ask experts or product owners questions, and get reviews and real-world experiences from consumers like them.

Thus, user-generated content helps increase the overall attention and content a subject (for example, a manufacturer's product) can get online and offline and may provide the advantage of improving retailer sales by increasing online and in-store awareness of the manufacturer's products, driving sales (which may cost the retailer nothing). Manufacturers are able to differentiate their products, and create a link to consumers at the same time.

Furthermore, manufacturers that provide user-generated content may be able to generate more "shelf space" on online retailer sites, allowing customers to differentiate products in the midst of competitive products. This allows manufacturers to increase overall product information without generating it themselves. Additionally, by distributing such user-generated content manufacturers can increase overall content volume, such as number of reviews or other types of content, therefore increasing the chances that its products will be chosen by shoppers who are interested in hearing the opinions and experiences, or obtaining assistance, from other users familiar with the product.

As discussed above, web pages of a commerce enabled web site usually contain at least two types of written content: 1) descriptive content and 2) supporting content such as user generated content. As there may be quite a large amount of user-generated content, this user-generated content may be presented in multiple pages. To implement a set of web pages associated with a product then, in most cases an initial page with an initial set of user-generated content is displayed (e.g. page 1). An event such as the clicking of a pagination link etc. must then occur to activate loading of additional user generated content on one or more subsequent web pages (e.g. page 2, 3, etc.).

Traditionally, the amount of content loaded on each web page is identical. For example, if page 1 has six pieces of user generated content (e.g. six reviews) pages 2, 3, 4, etc. would also have six pieces of user generated content (or less, for example, if the number of reviews associated with a product was not evenly divisible by six).

Figure 1A:
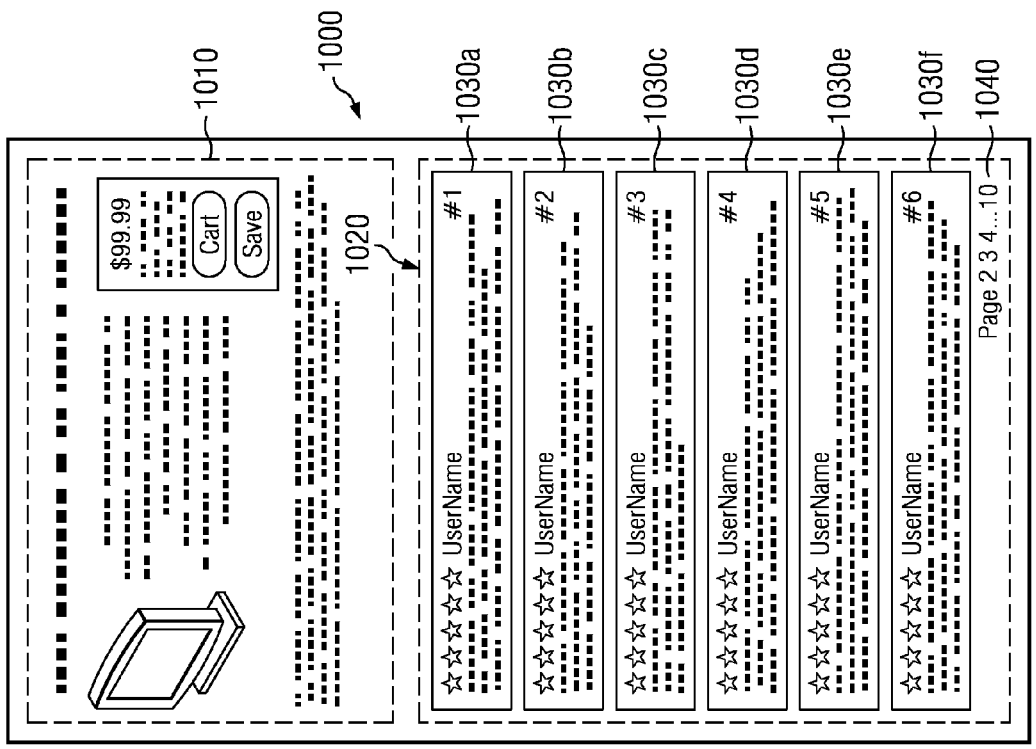

FIGS. 1A and 1B depict examples of the traditional way of implementing pagination in conjunction with the incorporation of user-generated content into a set of web pages associated with a product. Referring first to FIG. 1A, one embodiment of an initial web page 1000 associated with a product is depicted. The initial web page may have descriptive content 1010 associated with the product. Additionally, the initial web page may have supporting content 1020 including user generated content such as reviews 1030 or the like.

For purposes of the example depicted assume that there are 60 reviews 1030 associated with the product. Note here that in the initial web page 1000 there are 6 reviews 1030 incorporated. To provide for access to additional user-generated content pagination link(s) 1040 are included on the initial web page in association with the reviews 1030. The pagination links 1040 may, for example, be individual links to each of the subsequent pages for presentation of user-generated content or may comprise a "next" or "previous" link, etc.

As in traditional pagination the same amount (e.g. number of pieces, etc.) of user-generated content may be incorporated on the initial page and each subsequent page, in the current example there would be the initial page (e.g. page 1) comprising 6 reviews 1030 and nine subsequent pages (e.g. pages 2-10) each comprising six user reviews. Thus, pagination links 1040, in this example, provide individual links to each of those subsequent pages.

FIG. 1B depicts one embodiment of a subsequent web page associated with the initial web page of FIG. 1A. In other words, when a user clicks on the "2" pagination link 1040 he will be presented with the web page depicted in FIG. 1B. Here, the subsequent web page 1002 contains the same descriptive content 1010 incorporated on the initial web page 1000 and also includes supporting content 1022 including six additional user reviews 1030.

Pagination links 1042 provide individual links to the initial page (e.g. page 1) and each subsequent page (e.g. pages 3-10).

As it will be useful for an understanding of embodiments presented herein, note here that in traditional pagination the presentation of user generated content is linear. More specifically, in such a linear presentation, whatever sort order is being utilized to present reviews (or other user-generated content) in the set of web pages, the first number of reviews according to that sort order (e.g. the first six 1-6) will be presented in the initial web page while the number of following reviews (e.g. the next six 7-12) will be presented in the subsequent web page (e.g. page 2) and the next number of following reviews (e.g. the next six 13-18) will be presented in the web page subsequent to that (e.g. page 3), etc.

As noted above, traditional pagination is undesirable for a variety of reasons including that it provides an unsatisfactory user experience and may increase the chances of each of the web pages (e.g. the initial web page and each of the subsequent web page) associated with a product being grouped as a single page by a search engine indexer. Conversely then, such pagination techniques may decrease the likelihood that each of these web pages may be used individually by such a search engine to respond to a search request.

To illustrate in more detail, in many cases search engine indexers may group linked web pages based on the amount of duplicative content on those web pages. Suppose for purposes of this example that descriptive content 1010 is comprised of 300 words while each review 1030 is comprised of 100 words. In this case, initial page 1000 comprises 300 words of descriptive content 1010 and 600 words of supporting content 1020 (100 words×6 user reviews 1030) for a total of 900 words. Similarly, subsequent web page 1002 comprises 300 words of descriptive content 1010 and 600 words of supporting content 1022 (100 words×6 user reviews 1030) for a total of 900 words. However, 300 words of the 900 words if the subsequent web page 1002 are duplicative of the content of initial web page 1000. Thus, 33% of the content of subsequent web page 1002 is duplicative of the content of initial web page 1000. This amount of duplicative content may result in the grouping of the initial web page 1000 and the subsequent web page 1002 by a search engine indexer. It will be noted that the same results may occur with respect to the other subsequent web pages associated with the embodiment of FIGS. 1A and 1B.

Thus, not only is it desired to incorporate such user-generated content in a set of web pages in a manner that is tailored to user's desires, but additionally it is desired to incorporate this content in a manner that facilitates exposure of such web pages through search engines. Accordingly, attention is now directed to embodiments of the system and methods presented herein which allow a different amount of user-generated content to be incorporated into the set of web pages associated with the same product. More specifically, according to one embodiment, a first amount of user-generated content can be presented on an initial web page associated with the product and a different amount of user-generated content can be incorporated on subsequent pages. The amount of user-generated content that is incorporated into an initial page and the different amount incorporated into a subsequent web page may be configurable (e.g. by the operators of the web site that includes the web pages) or may be algorithmically determined.

Moreover, in other embodiments, differing sort orders may be utilized in conjunction with the initial web page and subsequent pages with the result that the user generated content is incorporated into the initial web page according to a first sort order and user-generated content is incorporated into subsequent web pages according to a different sort order. In this manner, the amount of user-generated content to be presented on each web page associated with a product (and thus the number of web pages in which such user generated content is incorporated) can be appropriately tailored such that they are both more valuable to users and consumed in a more desirable manner by search engine indexers.

It should be noted initially before proceeding further that while certain embodiments presented herein are described in conjunction with the incorporation of user-generated content into a set of web pages associated with a product, these descriptions and embodiments should not be taken as limiting the scope of other embodiments. For example, other embodiments may be usefully applied to the presentation of almost any other type of content in conjunction with web pages. Specifically, for example, such embodiments may be usefully applied to the presentation of search results by a search engine or other searching interface, whereby a first number of search results are displayed in an initial results web page returned to a user while a different number of search results are displayed in subsequent result web pages.

The amount of user-generated content to include on the initial web page (referred to herein as the initial amount) may be specified by the operators of the web site comprising the set of web pages (e.g. a retailer). The initial amount may be specified as a fixed number of pieces of user-generated content, some percentage or ratio of total amount of user-generated content, or may be some other definition entirely. Likewise, the amount of user-generated content to include on a subsequent web page (referred to herein as the subsequent amount) may be similarly specified.

Figure 2B:
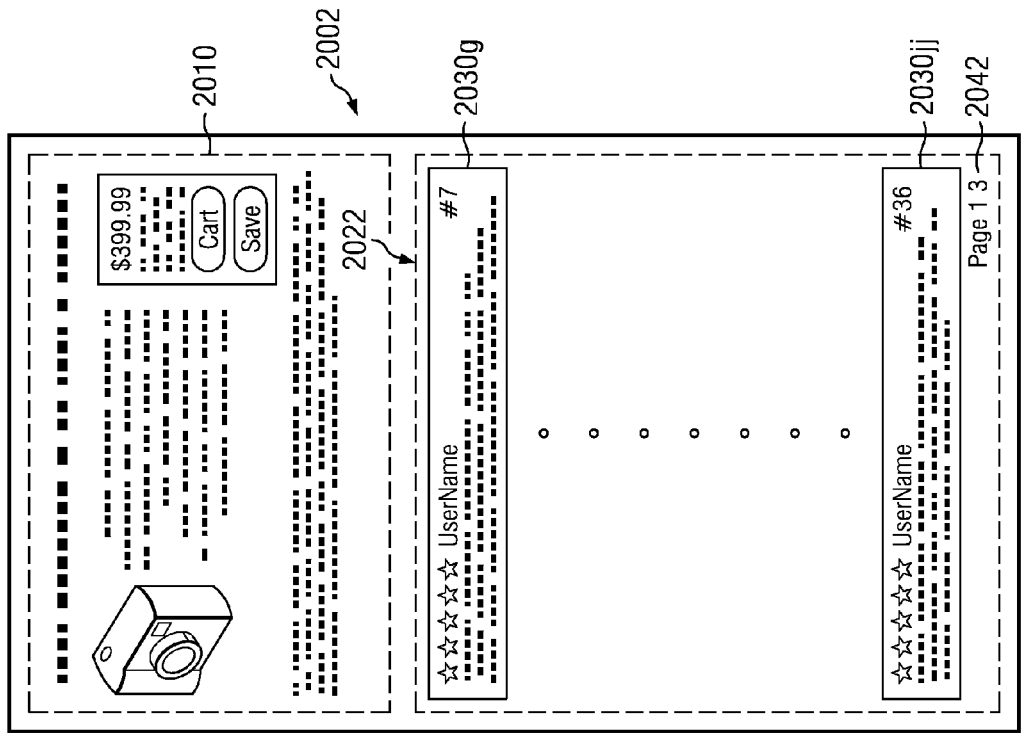
FIGS. 2A, 2B and 2C are graphical depictions of an embodiment of the pagination of content.
Figure 2A:
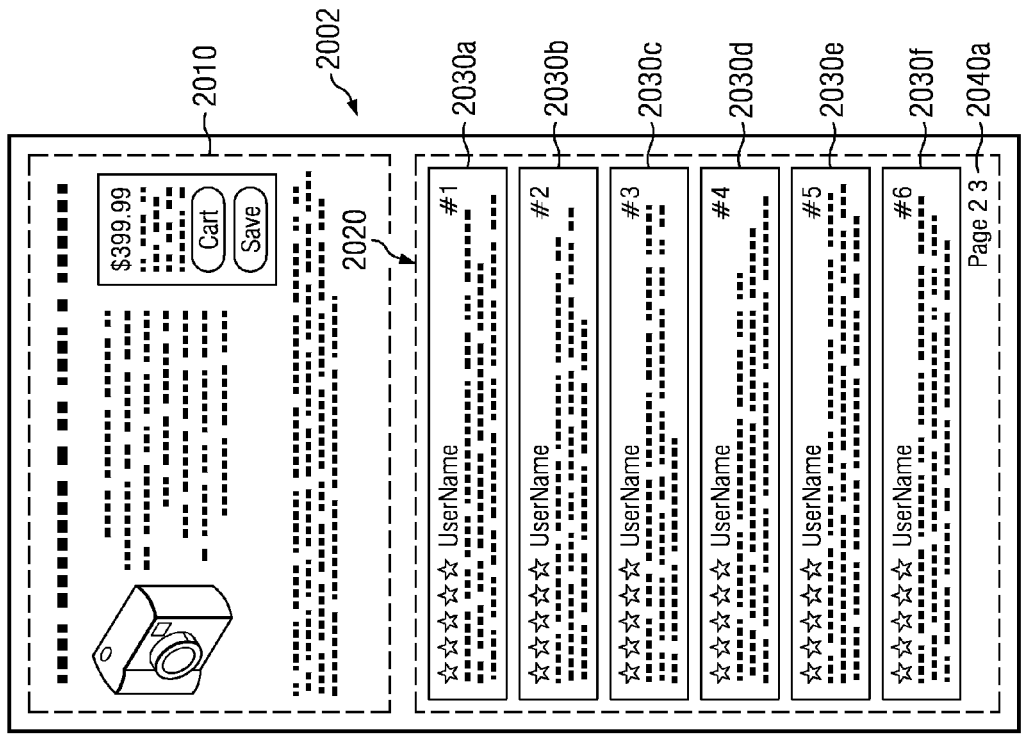
Figure 2C:
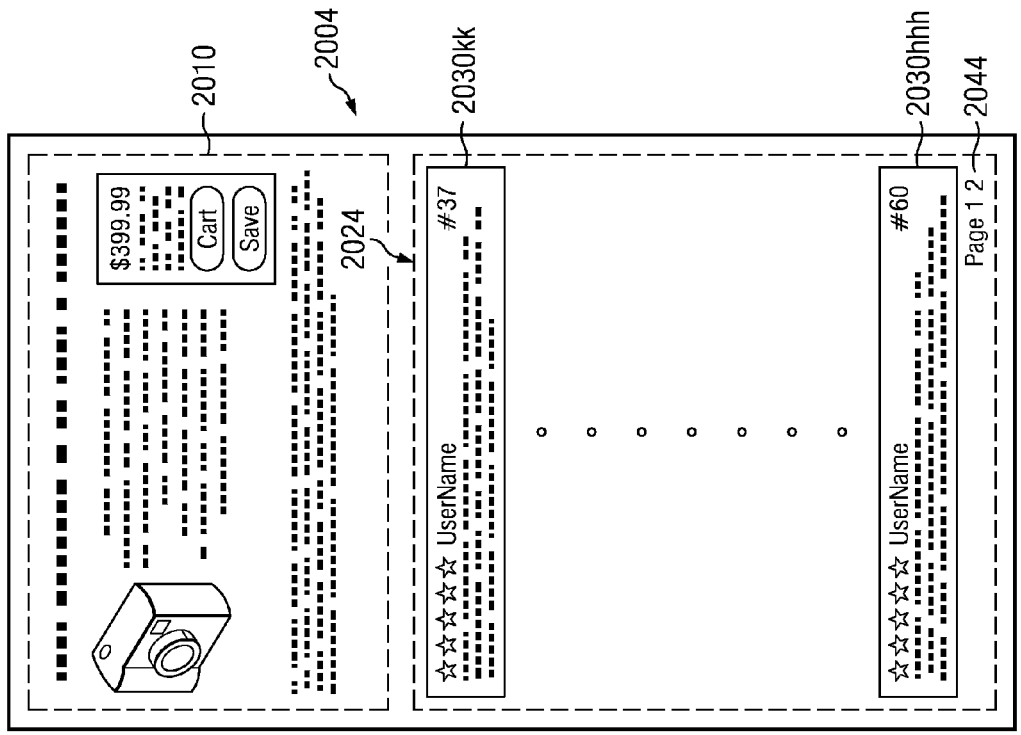

Turning now to FIGS. 2A, 2B and 2C, embodiments of web pages which utilize embodiments of pagination which allow different amounts of user-generated content to be incorporated into a set of web pages associated with a product are depicted. Referring first to FIG. 2A, one embodiment of an initial web page 2000 associated with a product is depicted. The initial web page 2000 may have descriptive content 2010 associated with the product. Additionally, the initial web page 2000 may have supporting content 2020 including user generated content such as reviews 2030 or the like.

For purposes of the example depicted assume that the operator of the retailer web site has specified that six pieces of user-generated content should be displayed on an initial web page. Thus, in initial web page 2000 there are 6 reviews 2030 incorporated. To provide for access to additional user-generated content pagination link(s) 2040 are included on the initial web page in association with the reviews 2030. Pagination links 2040 may, for example, be individual links to each of the subsequent pages for presentation of user-generated content or may comprise a "next" or "previous" link, etc.

Assume again that there are 60 reviews 2030 associated with the product. Assume further here that the operator of the retailer web site has specified that 30 pieces of user-generated content are to be included on subsequent web pages. Thus, on the web page subsequent to the initial page (e.g. page 2) there will be 30 reviews and on the last subsequent web page (e.g. page 3) there will be 24 reviews (as there are only 24 reviews remaining of the 60 total reviews). Pagination links 2040 provide individual links to these subsequent web pages (e.g. pages 2 and 3).

FIG. 2B depicts one embodiment of a subsequent web page associated with the initial web page of FIG. 2A. In other words, when a user clicks on the "2" pagination link 2040 he will be presented with the web page 2002 depicted in FIG. 2B. Here, the subsequent web page 2002 contains the same descriptive content 2010 incorporated on the initial web page 2000 and also includes supporting content 2022 including 30 additional user reviews 2030. Pagination links 2042 provide individual links to the initial page (e.g. page 1) and the last subsequent web page (e.g. page 3).

FIG. 2C depicts one embodiment of the last subsequent web page associated with the initial web page of FIG. 2A and the subsequent web page of FIG. 2B. In other words, when a user clicks on the "3" pagination link he will be presented with the web page 2004 depicted in FIG. 2C. Here, the subsequent web page 2004 contains the same descriptive content 2010 incorporated on the initial web page 2000 and also includes supporting content 2024 including 24 additional user reviews 2030. Pagination links 2044 provide individual links to the initial page (e.g. page 1) and the other subsequent web page (e.g. page 2).

As can be seen then, the embodiment as depicted in FIGS. 2A-2C may provide a better user experience, as a user's indication that he wishes to see additional user-generated content results in the display of larger amount of user generated content on a subsequent web page and requires a user to interact with fewer times to review the user-generated content associated with a product.

Additionally, embodiments of this type may reduce the chances of each of the set of web pages being grouped together by a search engine indexer. Suppose again for purposes of this example that descriptive content 2010 is comprised of 300 words while each review 2030 is comprised of 100 words. Here, initial page 2000 comprises 300 words of descriptive content 2010 and 600 words of supporting content 2020 (100 words×6 user reviews 2030) for a total of 900 words. However, subsequent web page 2002 comprises 300 words of descriptive content 2010 and 3000 words of supporting content 2022 (100 words×30 user reviews 2030) for a total of 3300 words. In this case, only 300 words of the 3300 words of the subsequent web page 2002 are duplicative of the content of initial web page 2000. Thus, only 9% of the content of subsequent web page 2002 is duplicative of the content of initial web page 2000. Having this amount of duplicative content may lessen the likelihood that the subsequent web page 2002 is grouped with the initial web page 2000 by a search engine indexer. A similar analysis applies to the last subsequent web page 2004 with respect to both initial web page 2000 and subsequent web page 2002.

It will be noted with respect to the above analysis that in the above embodiment, descriptive content remains duplicative between each of the set of web pages. In other to further reduce the likelihood that the set of web pages (or a subset thereof) are grouped together it may be desired to further reduce the amount of duplicative content. Therefore, in certain embodiments, descriptive content may only be included on an initial web page and may be excluded from subsequent web pages. This embodiment may accomplish this by, for example, using a different web page template for the initial web page and for subsequent web page.

While the above embodiment may serve to tailor the presentation of user-generated content to a user's desire by incorporating a different amount (e.g. more or less) of user-generated content on a subsequent page, it may be useful to further tailor the incorporation of user-generated content by incorporating such content according to two different sort orders. Thus, the user-generated content is incorporated into the initial web page according to a first sort order and is incorporated into subsequent web pages according to a different sort order. The sort order to utilize in association with the initial web page (referred to herein as the initial sort order) may be specified by the operators of the web site comprising the set of web pages (e.g. a retailer), be selected by providers of user-generated content, or otherwise determined. Likewise, the sort order to utilize on one or more subsequent web page(s) (referred to herein as the subsequent sort order) may be similarly specified. These sort orders may comprise, for example, featured, most recently or least recently generated, length, most helpful, highest or lowest rating, etc. Other sort orders will be known to those of skill in the art and are encompassed within the scope of this disclosure.

Figure 3A:
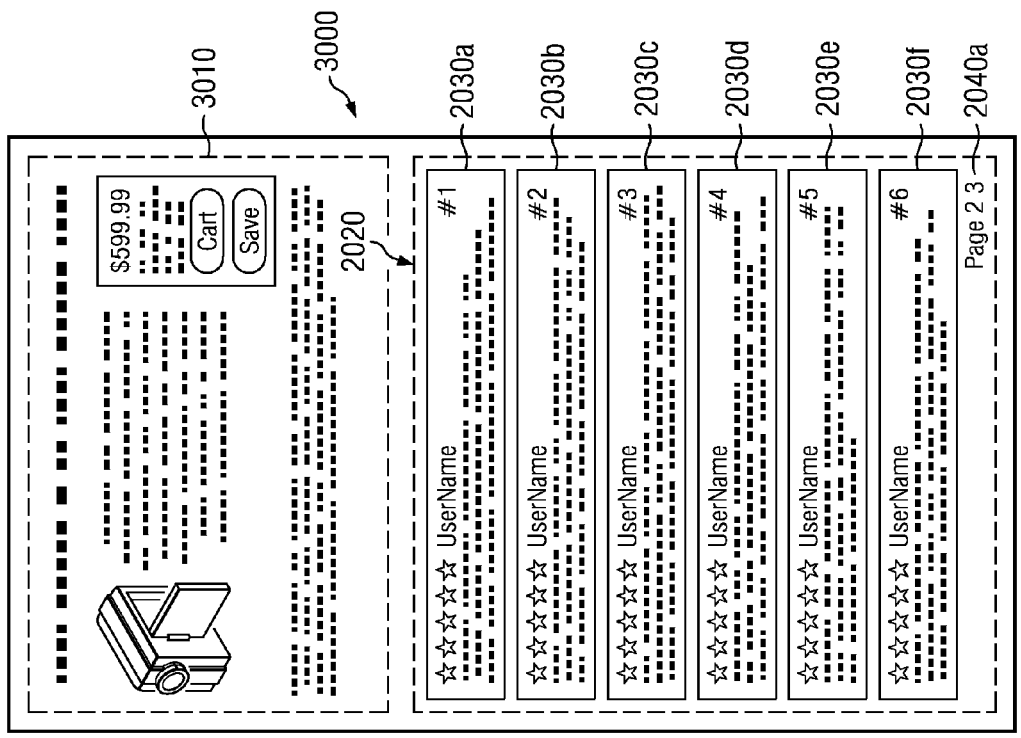
FIGS. 3A, 3B and 3C are graphical depictions of an embodiment of the pagination of content.
Figure 3C:
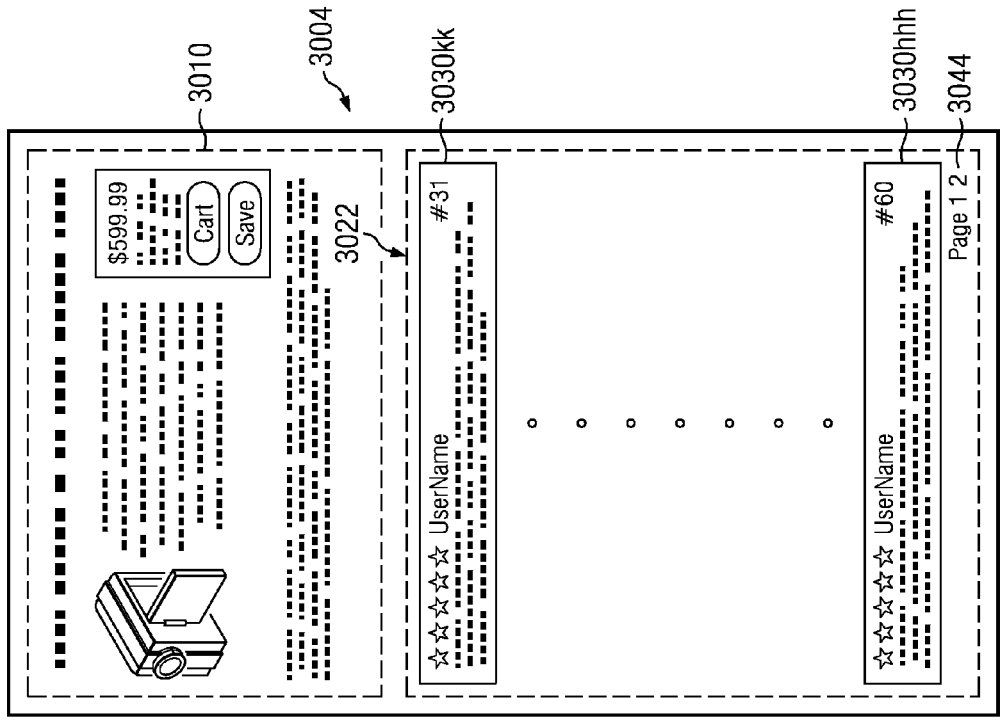
Figure 3B:
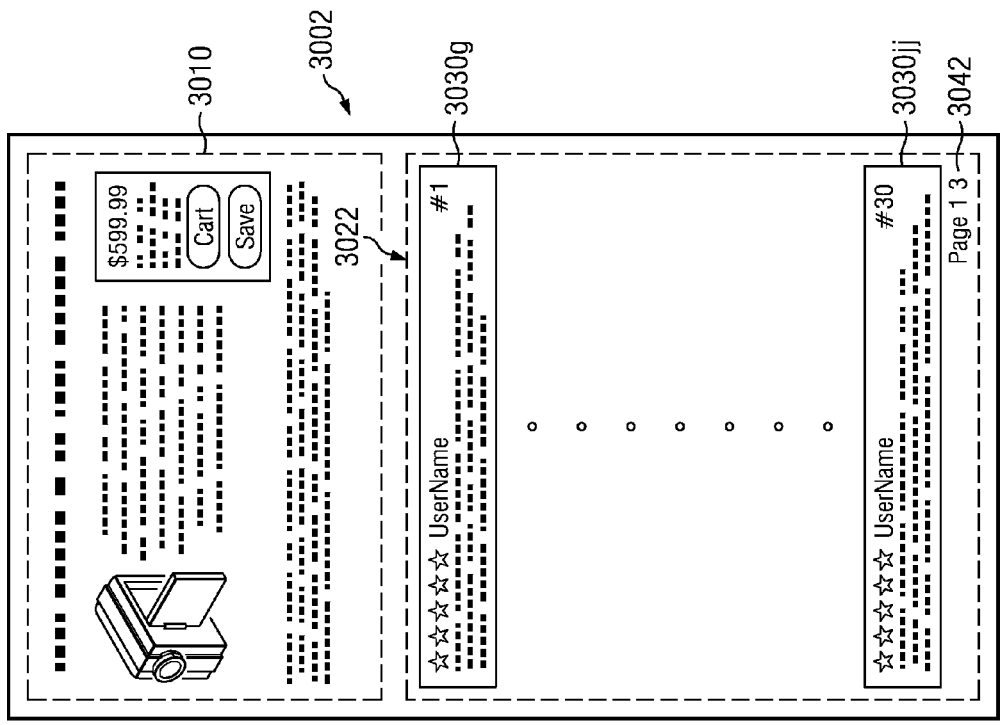

Referring now to FIGS. 3A-3C, embodiments of web pages which utilize embodiments of pagination which allow different amounts of user-generated content to be incorporated into a set of web pages for a product according to different sort orders are depicted. In FIG. 3A one embodiment of an initial web page 3000 associated with a product is depicted. The initial web page 3000 may have descriptive content 3010 associated with the product. Additionally, the initial web page 3000 may have supporting content 3020 including user generated content such as reviews 3030 or the like. The amount of user-generated content to include on the initial web page 3000 may be specified by the operators of the web site comprising the set of web pages (e.g. a retailer). Additionally, the operators of the web site may specify an initial sort order according to which user-generated content is to be incorporated into the initial web page. Thus, the user-generated content associated with the product may be sorted according to the initial sort order and the initial amount specified by the operators selected from the user-generated content sorted according to this initial sort order.

Assume again that there are 60 reviews 2030 associated with the product. Additionally, assume for purposes of this example that the operator of the retailer web site has specified that six pieces of user-generated content should be displayed on an initial web page. Furthermore, suppose the operator of the retailer web site has specified that time of generation (sometimes referred to as recency or freshness) is the initial sort order. Thus, the 6 reviews 3030 of the 60 review which have been generated most recently may be incorporated in initial web page 3000. Note here that the "#1" through "#6" in each of the reviews 3030 correspond to the ordering of that review with respect to the initial sort order. For example, review 3030a "#1" is the most recently generated review, review 3030b "2" is the next most recently generated review, etc. To provide for access to additional user-generated content pagination link(s) 3040 are included on the initial web page in association with the reviews 3030.

Continuing with the above example, suppose that here the operator of the retailer web site has specified that 30 pieces of user-generated content are to be included on subsequent web pages and that most helpful is the sort order to be utilized for incorporation of user-generated content into subsequent web pages. Thus, on the web page subsequent to the initial page (e.g., page 2) there will be 30 reviews and on the last subsequent web page (e.g., page 3) there will be 30 reviews (as the reviews are presented according to a different sort order, the reviews presented on the initial web page will also be presented on page 2 or page 3, albeit according to the subsequent sort order—most helpful). Pagination links 3040 provide individual links to these subsequent web pages (e.g., pages 2 and 3).

FIG. 3B depicts one embodiment of a subsequent web page associated with the initial web page of FIG. 3A. In other words, when a user clicks on the "2" pagination link 3040 he will be presented with the web page 3002 depicted in FIG. 3B. Here, the subsequent web page 3002 contains the same descriptive content 3010 incorporated on the initial web page 3000 and also includes supporting content 3022 including 30 reviews 2030. Reviews 3030 are incorporated into the web page 3002 according to the subsequent sort order, in this example most helpful. Thus, the "#1" through "#30" in each of the reviews 3030 correspond to the ordering of that review with respect to the subsequent sort order. For example, review 3030f "#1" is the most helpful review, review 3030j "#30" is the thirtieth most helpful review, etc. Pagination links 2042 provide individual links to the initial page (e.g. page 1) and the last subsequent web page (e.g. page 3).

It should be briefly noted here with reference to FIGS. 3a, 3B and 3C that while reviews 3030 depicted in FIG. 3A have been given a set of reference numerals (e.g. 3030a-3030f) and the set of reviews 3030 depicted in FIGS. 3B and 3C have been given reference numerals beginning with a subsequent letter (e.g. 3030g) this is for illustrative purposes only. It should be understood that the reviews presented according to the initial sort order (e.g. web page 3000 of FIG. 3A) will also be presented according to the subsequent sort order in the subsequent web pages (e.g. web pages 3002, 3004 of FIGS. 3B and 3C). For example, while review 3030j "#1" in FIG. 3B is the most helpful review and review 3030a "#1" in FIG. 3A is the most recently generated, these reviews 3030a, 3030j could be the same if the most recently generated review was also the most helpful review.

Moving on, FIG. 3C depicts one embodiment of the last subsequent web page associated with the initial web page of FIG. 3A and the subsequent web page of FIG. 3B. In other words, when a user clicks on the "3" pagination link he will be presented with the web page 3004 depicted in FIG. 3C. The subsequent web page 3004 contains the same descriptive content 3010 incorporated on the initial web page 3000 and also includes supporting content 3024 including 30 additional user reviews 3030. Reviews 3030 are incorporated into the web page 3004 according to the subsequent sort order, in this example most helpful. Thus, the "#31" through "#60" in each of the reviews 3030 correspond to the ordering of that review with respect to the subsequent sort order. For example, review 3030kk "#31" is the thirty-first most helpful review, review 3030hhh "#60" is the sixtieth most helpful review, etc. Pagination links 2044 provide individual links to the initial page (e.g. page 1) and the other subsequent web page (e.g. page 2).

As can be seen then, the embodiment as depicted in FIGS. 3A-3C may provide a better user experience by tailoring the presentation of user-generated content to a user's desire. More specifically, the presentation of user-generated content may be presented according to a sort order that a user may desire when viewing an initial web page associated with a product and presented according to a different sort order when a user indicated her wishes to view additional user generated content.

While the above embodiments have depicted the incorporation of content such that the presentation of reviews is tailored to both user value and search engine exposure, it will be noted that appropriate mappings of this type may be accomplished with almost any type of content, user-generated or otherwise, and thus the appropriate mapping may differ based on the type of content. For example, stories may be longer (e.g., contain more words) and thus may contain more possible search terms. Accordingly embodiments of an appropriate mapping for longer user-generated content, including stories, may entail that each piece of content be incorporated on a separate web page.

Figure 4B:
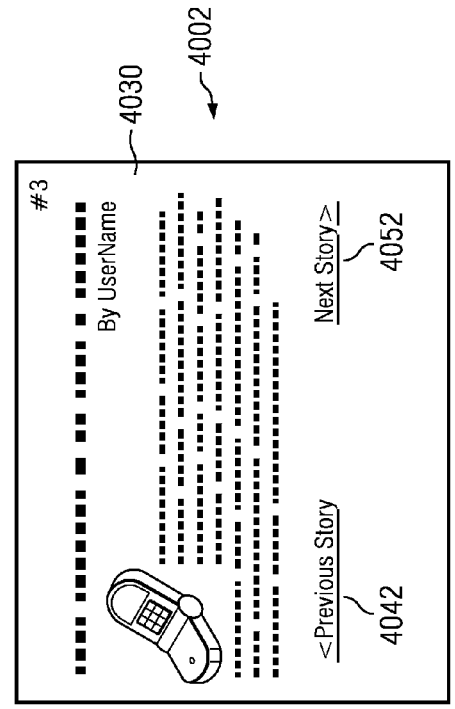
FIGS. 4A and 4B are graphical depictions of an embodiment of the pagination of content.
Figure 4A:
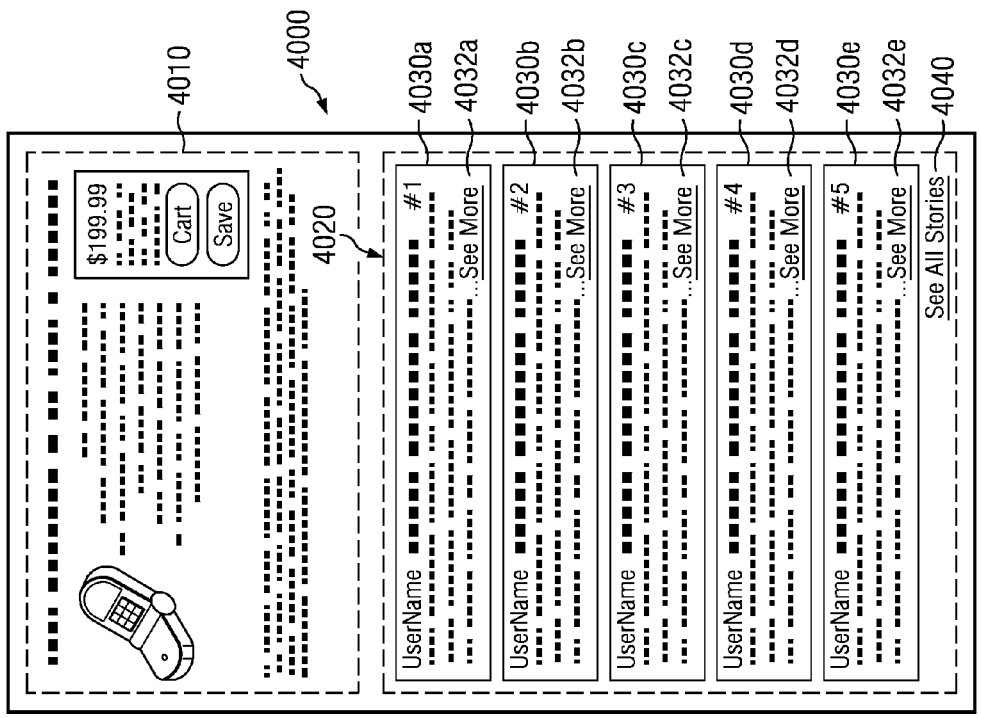

With that in mind, FIGS. 4A and 4B depict embodiments of web pages which utilize embodiments of pagination that allow summaries of user-generated content to be incorporated into an initial web page associated with a product and the entirety of each piece of user generated content to be incorporated into a single subsequent web page. Referring first to FIG. 4A, one embodiment of an initial web page 4000 associated with a product is depicted. The initial web page 4000 may have descriptive content 4010 associated with the product. Additionally, the initial web page 4000 may have supporting content 4020 including user-generated content such as story summaries 4030 or the like. Each of the story summaries 4030 may comprise a portion (e.g., the first 100 words, the first 75 words, the first paragraph, etc.) of an associated story along with a link to "See More" link 4032 (which may be labeled almost anything desired) that will be linked to a subsequent web page that comprises the entire story. There may also be a "See All Stories" link 4040 (which may also be labeled almost anything desired) that is linked to a subsequent web page containing an entire story.

Moving now to FIG. 4B, one embodiment of a subsequent web page that comprises a single story is depicted. Such a web page 4002 will be presented for example, if a user clicks on the "See More" link 4032 or the "See All Stories" link 4040 of FIG. 4A. Here, a single story is presented in its entirety, along with a "Previous Story" link 4042 (which may be labeled almost anything desired) and a "Next Story" link 4052 (which may be labeled almost anything desired). It will be noted here that the "Previous Story" or "Next Story" links may or may not be present based on which story is being presented. For example, if the first story is being presented (e.g. the user clicked on "See All Stories or the "See More" link to story "#1") there may be no "Previous Story". It will also be noted that the sort order by which the summaries of the stories 4030 or the stories presented in the subsequent web pages and amount of summaries or stories on web page that are presented may be configured by the operator of the retailer's web site or otherwise configured, as discussed above.

As can be seen then, by presenting stories using a set of web pages according to embodiments such as those depicted with respect to FIGS. 4A and 4B a better user experience can be provided, as a user's indication that he wishes to see additional user-generated content results in the display of entire stories on independent web pages, allowing a user to fully view such longer form content. In addition to tailoring the incorporation of content to a user's desire such embodiments may simultaneously increase the number of web pages that may be indexed individually by a search engine indexer and the likelihood that such web pages will be indexed individually.

Figures 1, 5A:
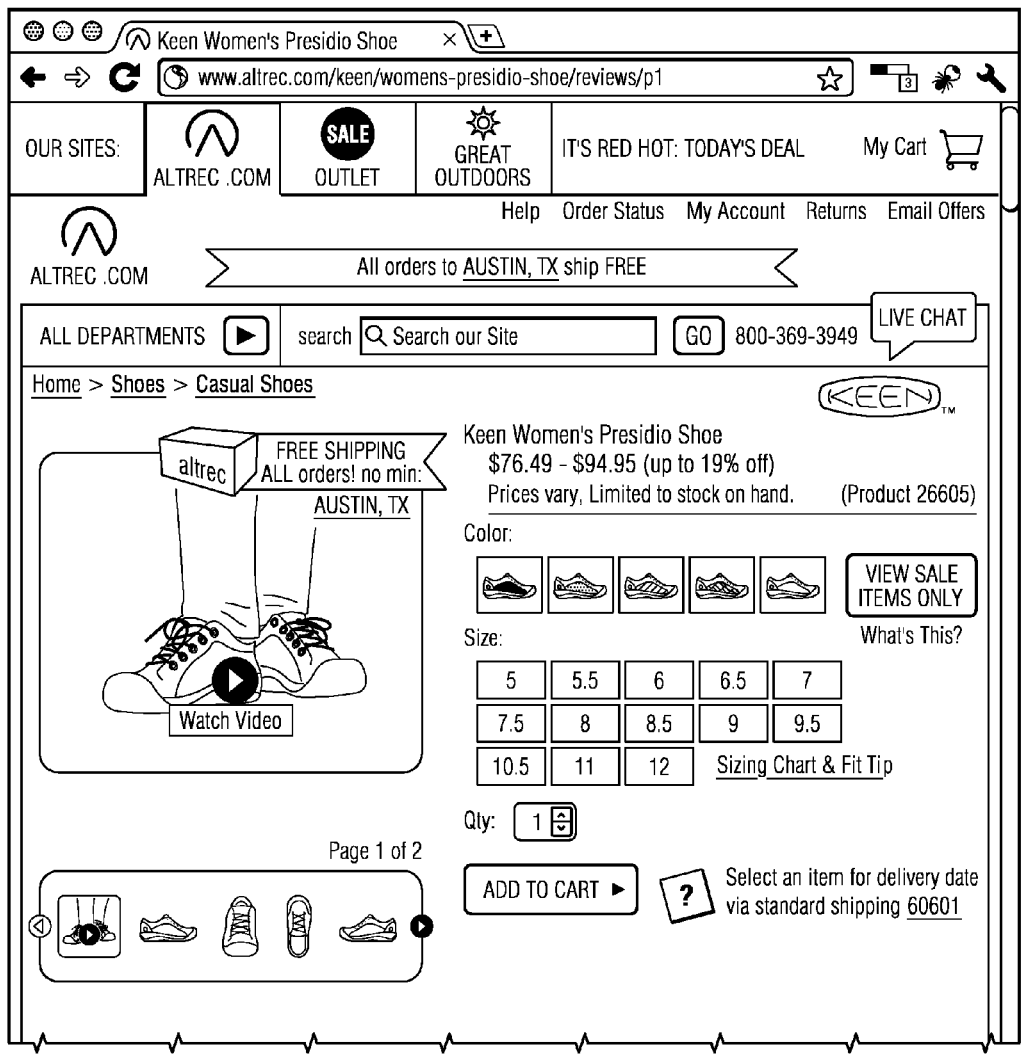
Figures 1, 5B:
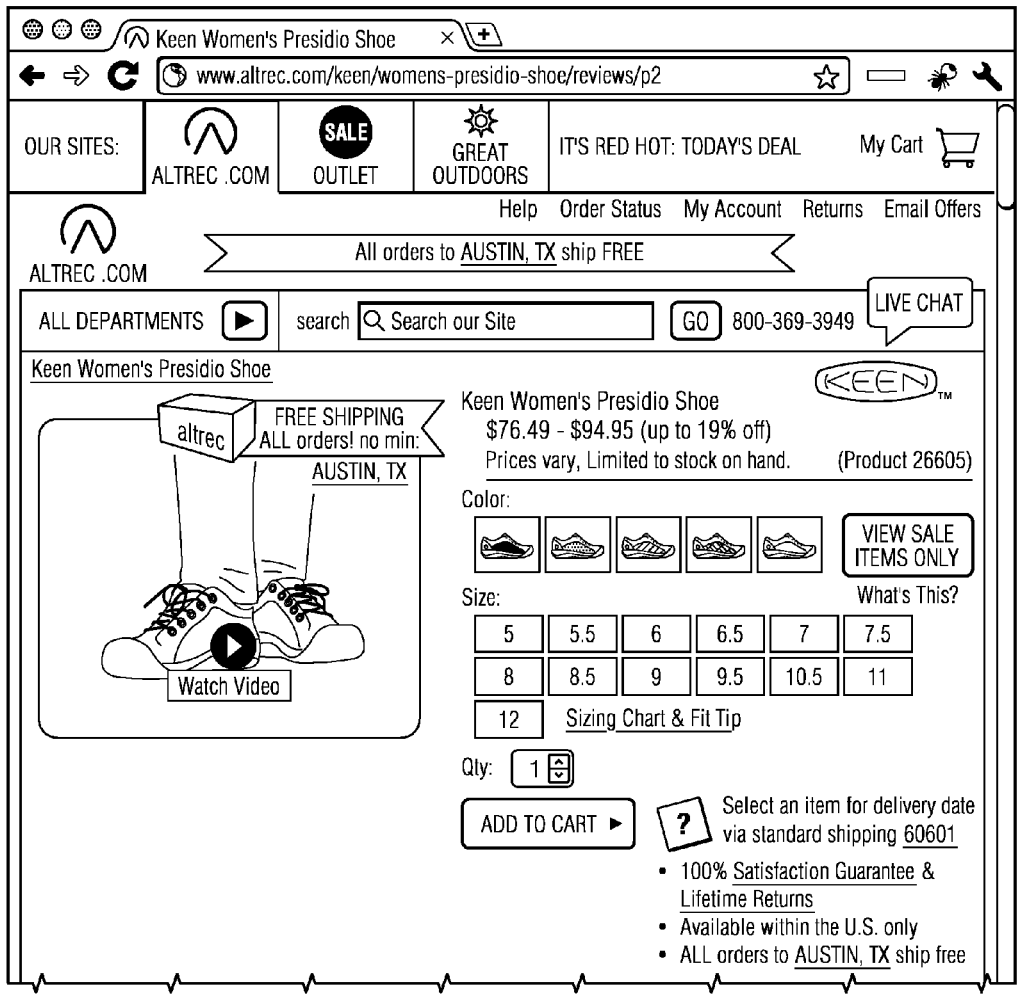
Figure 5C:
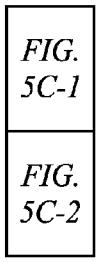
Figures 1, 5C:
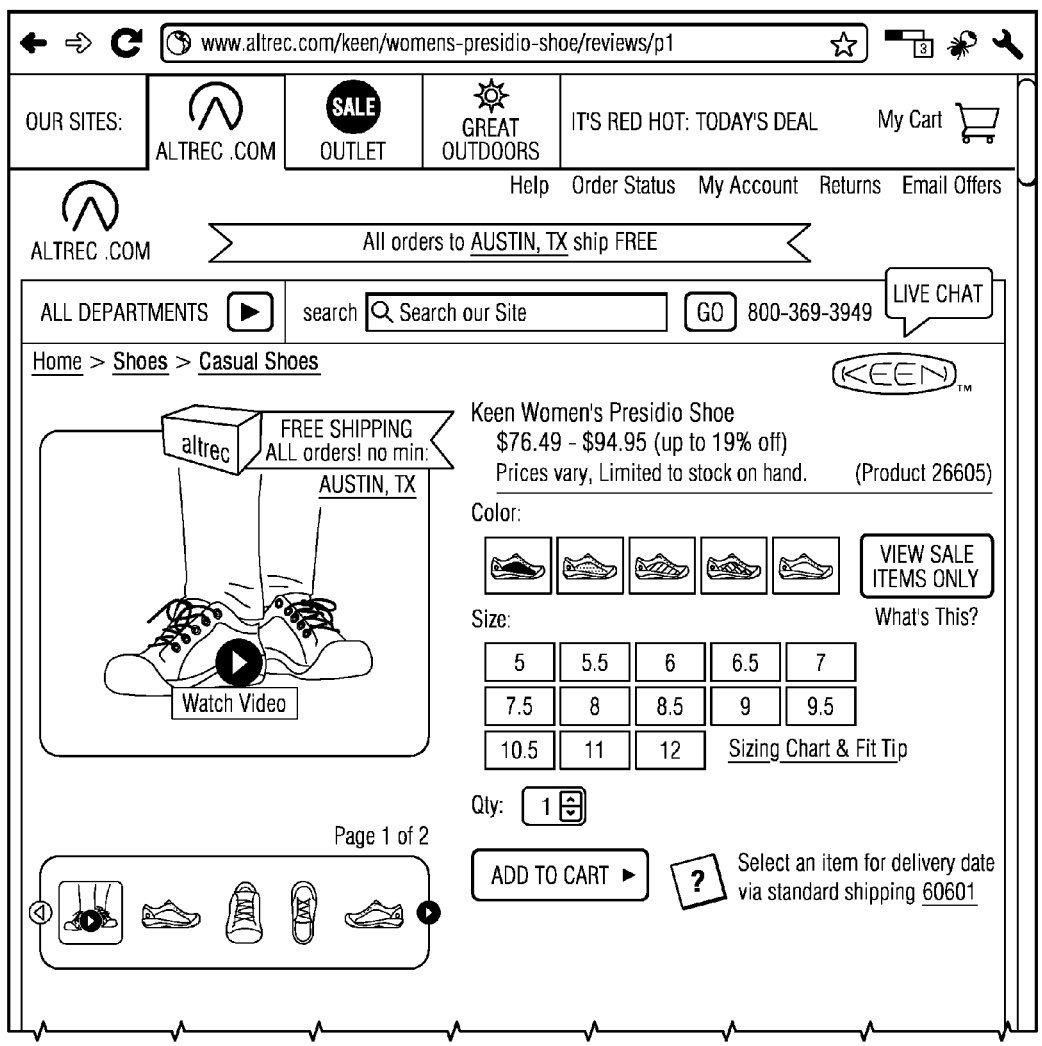
Figures 1, 5D:
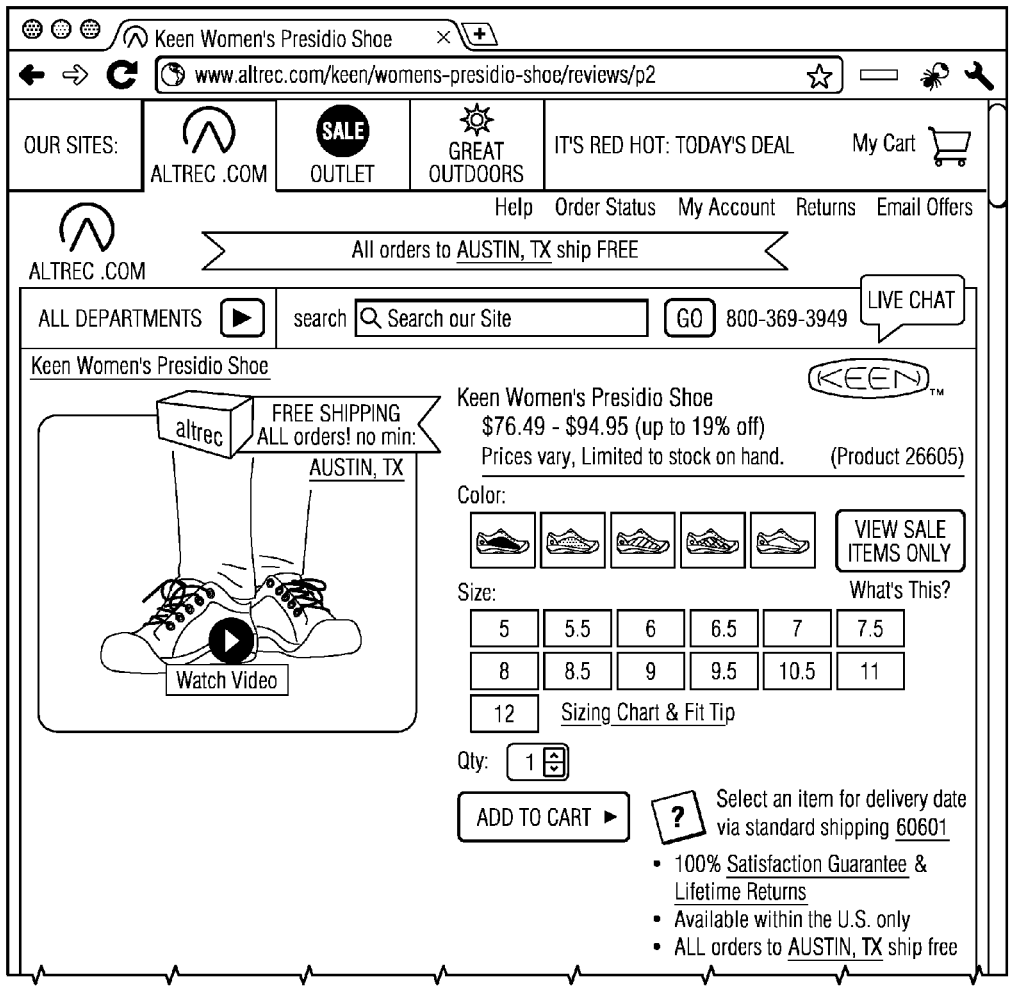
Figure 5E:
Figures 1, 5E:
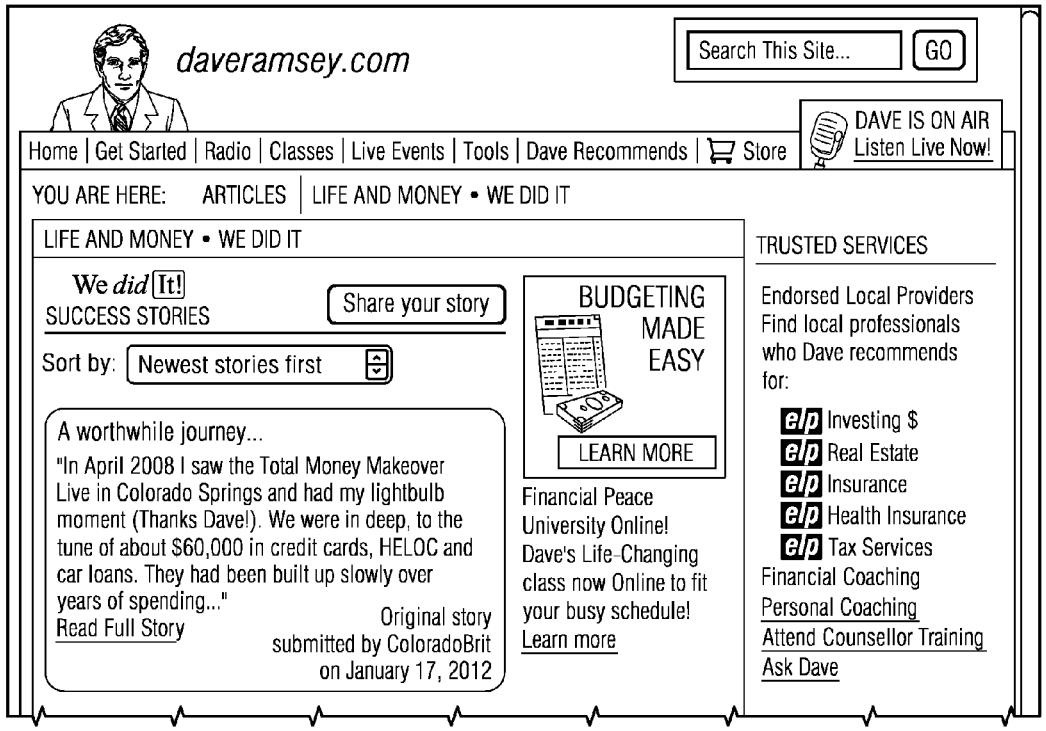
Figures 2, 5E:
Figure 5F:
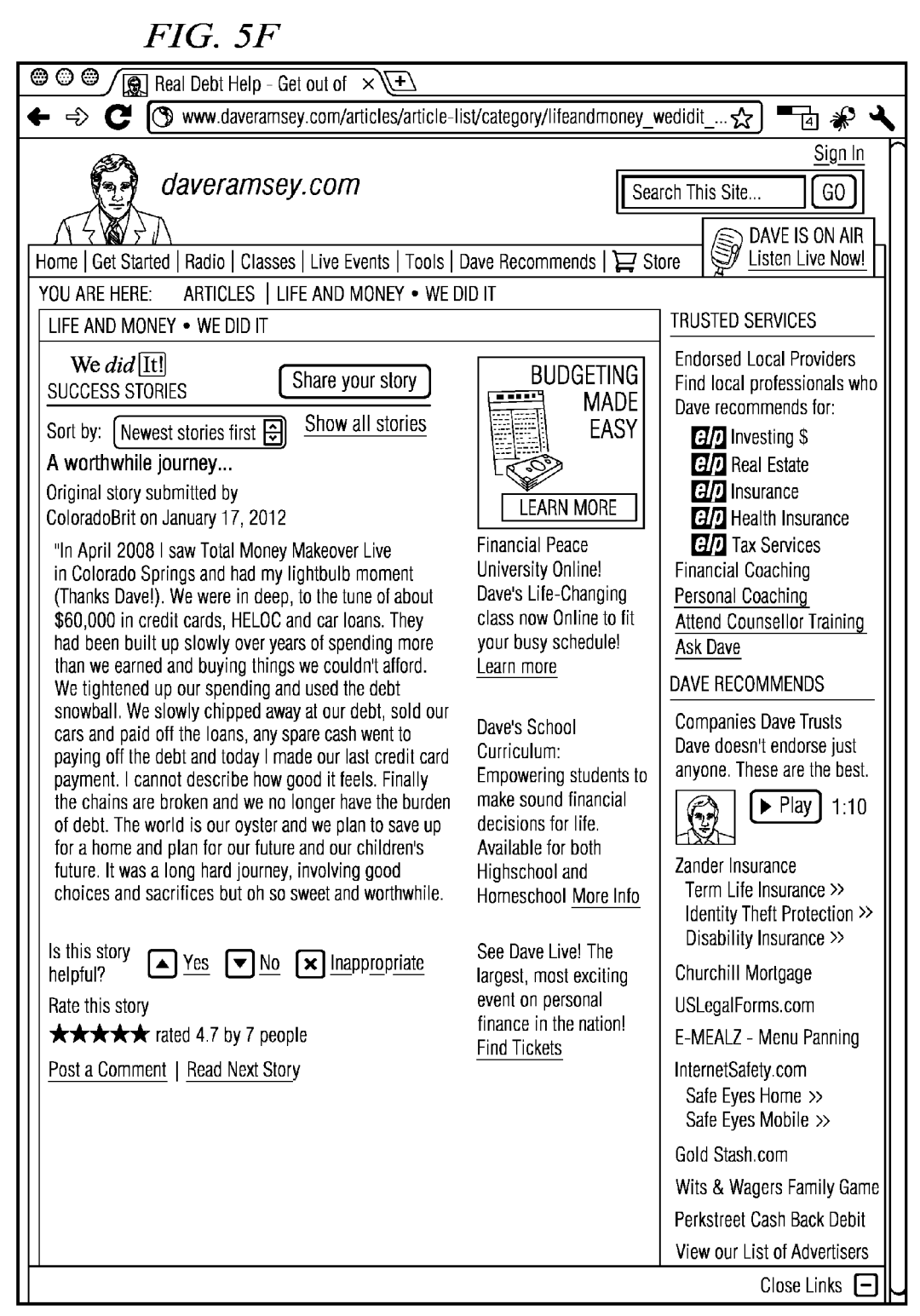

Referring now to FIGS. 5A-5E, actual examples of rendered web pages according to embodiments as discussed herein are presented. FIGS. 5A and 5B depict respectively an example of an initial web page where a first amount of user-generated content is presented according to an initial sort order (e.g. featured) and a subsequent web page where a different amount of user-generated content is presented according to the same sort order. Similarly, FIGS. 5C and 5D depict an example of an initial web page where a first amount of user-generated content is presented according to an initial sort order (e.g. freshness) and a subsequent web page where a different amount of user-generated content is presented according to a subsequent sort order (e.g. helpfulness). FIGS. 5E and 5F are rendered web pages, where summaries of user-generated content (e.g. summaries of stories) are incorporated into an initial web page associated with a product and a subsequent web page where the entirety of a piece of user-generated content is incorporated.

In conjunction with embodiments discussed above, it may now be helpful to discuss embodiments of how content may be incorporated into a web site. In particular, as discussed above it is desirable that user generated content be exposed to search engine indexers in a manner that such user generated content is indexed in association with the web page on which such user generated content is included.

One embodiment of exposing such user generated content to search engines indexers in association with a web page is to incorporate the content directly into the web page, such that the source code of the web page itself comprises the user generated content (e.g., for example, the HTML of the web page comprises the user generated content that is to be displayed on the web page itself). In this manner, when the source code of the web page is indexed by a search engine indexer the user generated content is processed by the search engine indexer in conjunction with the processing of the source code of the web page.

However, utilizing only this method of incorporating user generated content into a web page is less than desirable for a variety of reasons, including that the user generated content that is exposed may be static in nature and thus may be stale at the time of exposure. Thus, it is desired to incorporate such user generated content into a web page in a manner that the user generated content is exposed to a search engine indexer while still allowing freshness of the incorporated user generated content to be maintained.

In particular, both manufacturers and other retailers may desire to produce or include user-generated content on their sites. A manufacturer may, however, have a variety of channels where products are sold, making it difficult to gather such data. Similarly, even if the manufacturer is aware of each of the retailers selling its products, each of the retailers may have, for example, a different structure or layout for a site or different identifiers of for the same product. This means that it may be difficult to locate and collect data pertaining to their products, to process such data or to distribute such user-generated content.

Accordingly, embodiments of system and methods for the distribution of user-generated content have been developed. Certain of these embodiments may be better understood with reference to U.S. patent application Ser. No. 12/243,679 entitled "METHOD AND SYSTEM FOR DISTRIBUTION OF USER GENER- ATED CONTENT" by inventors Bockius et al. filed Oct. 1, 2008; U.S. patent application Ser. No. 12/614,016 entitled "METHOD AND SYSTEM FOR PROMOTING USER GENERATION OF CONTENT" by inventors Chen et al. filed Nov. 6, 2009, U.S. patent application Ser. No. 12/698,447 entitled "METHOD AND SYSTEM FOR PROVIDING CONTENT GENERATION CAPABILITIES" by Chen et al.; U.S. patent application Ser. No. 13/289,586 entitled "METHOD AND SYSTEM FOR DISTRIBUTION OF CONTENT" by inventors DeHaven et al., filed Nov. 4, 2011, and U.S. patent application Ser. No. 13/289,724 entitled "METHOD AND SYSTEM FOR DISTRIBUTION OF CONTENT USING A SYNDICATION DELAY" by inventors DeHaven et al., filed Nov. 4, 2011, which are all fully incorporated herein by reference.

Specifically, embodiments as disclosed herein may allow content to be generated by a user at a web site (for example, a manufacturer's or other retailer's site (or another site altogether)) with respect to an associated subject (for example, a product, brand, category, service, account, etc.) This content may then be distributed to one or more retailers who sell or are otherwise associated with that subject such that the user generated content may be incorporated into the retailer's site in conjunction with that subject to allow consumers shopping at that retailer to access or view such user generated content.

More particularly, in one embodiment, users may generate and submit content on a web site (for example, a manufacturer's or retailer's site) using one or more content generation tools incorporated in a retailer's, manufacturer's, or other's site (for example, these other web sites may include a content generation tool where a user may create content and may be distinct from the retailer's or manufacturer's site). This user generated content may be received at a content distribution system and user-generated content associated with a particular product, category, brand, etc. may then be distributed to one or more retailers who sell this product, category, brand, etc. such that this content may be incorporated into the retailer's site in association with that product, category, brand, etc.

As significant effort and expense has been invested in the gathering and dissemination of such user generated content and this user generated content may have a profound effect on how the web pages which incorporate such user generated content are exposed through a search engine it is highly desired by the operators of web sites which utilize content from a content distribution system that such user generated content be indexed in conjunction with the web page(s) of their site by search engine indexers. These search engine indexers may utilize such criteria as content richness (keyword density), freshness (recency) of content included on web page, Query Deserves Freshness (QDF), etc.

In some cases, however, the manner in which such user generated content is incorporated into web pages may affect the indexing of that content. In particular, the manner by which user generated content from a centralized content distribution system is incorporated into a web page may impede the indexing of such user generated content in conjunction with the web page in which it is exposed. Thus, it is desirable that such user generated content be exposed to search engine indexers in a manner that such user generated content is indexed in association with the web page on which such user generated content is included.

To that end, attention is now directed to methods and systems for incorporating user generated content into a web page. In particular, embodiments of such systems and methods may incorporate user generated content into a web page such that the user generated content can be consumed by indexers associated with search engines in association with that web page. In this manner the web page which incorporates such content may be more highly ranked by these search engines with respect to, for example, one or more key words.

Figure 6:
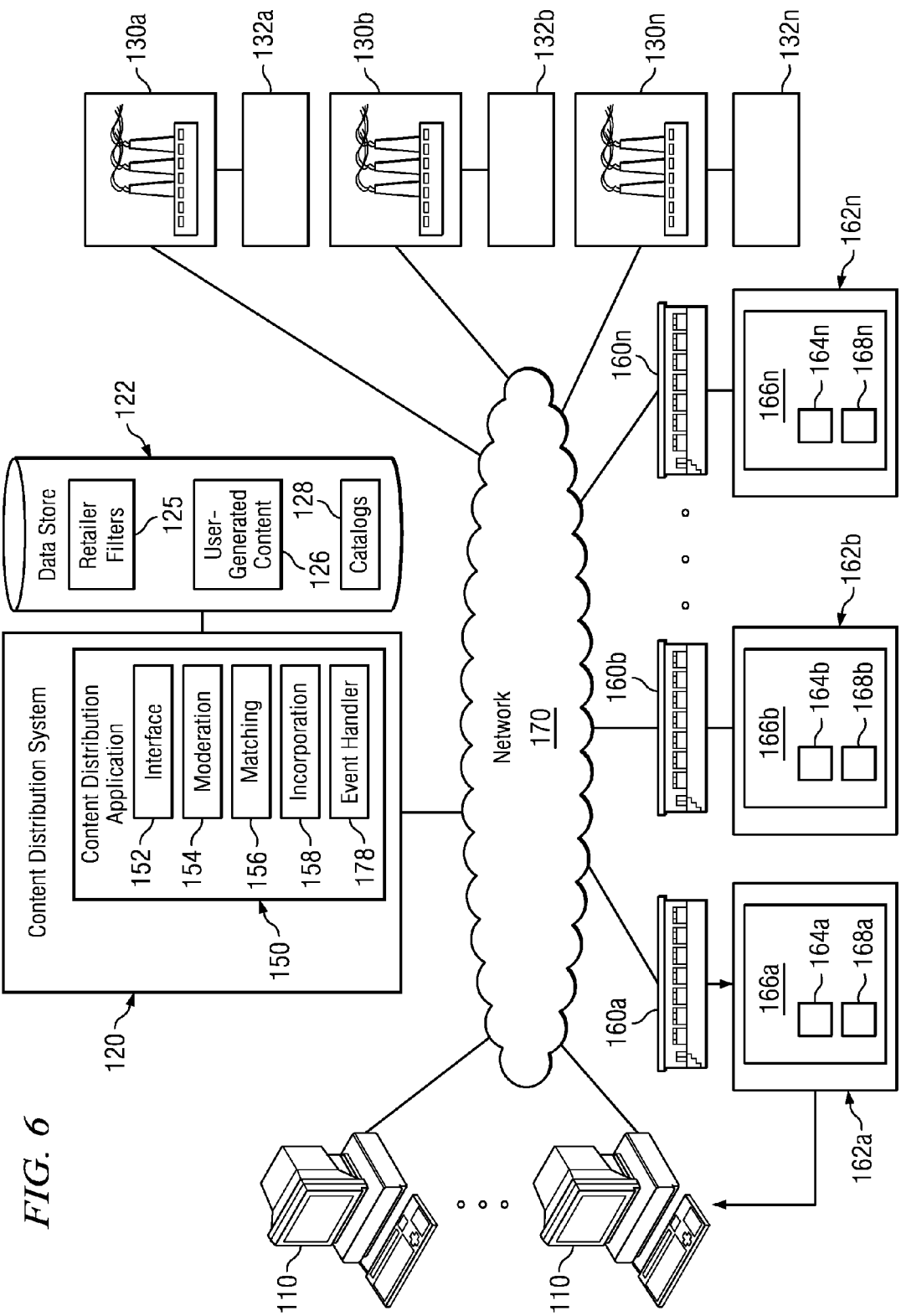
FIG. 6 is a block diagram of one embodiment of an architecture in which a content distribution system may be utilized.

Turning now to FIG. 6, one embodiment of a content distribution topology including one embodiment of a content distribution system is depicted. Manufacturers 130 may produce, wholesale, distribute or otherwise be affiliated with the manufacturer or distribution of one or more products. Retailers 160 may be sales outlets for products made by one or more of manufacturers 130. In fact, in most cases each retailer 160 will sell products from multiple manufacturers 130. These products may be provided for sale in conjunction with one or more web sites (referred to also as sites) 162 (or brick and mortar stores) provided by each of retailers 160 such that users at computing devices 110 may access a web site system (e.g. one or more computing device, which may for example, include one or more web servers) providing the retailer's site 162 over network 170 (for example, the Internet or another type of communications network) in order to purchase these products or perform other actions.

In addition to offering the ability to purchase these products, retailer's site 162 may offer the ability for a user to access user generated content associated with certain subjects such as products, categories of products, brands, etc. offered for sale on the retailer's site 162. By accessing such user generated content at the retailer's site 162 a user may be better able to make a purchasing decision with respect to the various products offered for sale on that retailer's site 162 or may be more inclined to buy a product, as the user feels that the product has received positive user generated content (reviews, ratings, questions/answers, etc.) from a critical mass of other users, etc. A user may thus purchase a manufacturer's product from a retailer 160 using retailer's site 162.

Retailer site 162 may also offer the ability for a user to generate content with respect to products offered for sale by retailer 160 (or other products). In other words, a user may utilize the retailer's site 162 to generate user reviews, ratings, comments, problems, issues, question/answers, or almost any other type of content regarding a product or experience with the product, brand, manufacturer or retailer, where this user-generated content may be displayed to other users accessing retailer's site 162.

It will be apparent, however, that there may be many other ways to purchase or obtain such a product. The product may be offered for sale at many physical stores which may or may not have an online presence (for example, a site), at other retailer's sites 162, the product may be purchased second hand, received as a gift, etc. At some point then the person who obtained this product may desire to provide some sort of feedback on this product and for a variety of reasons, such a purchaser may not have access to, or may not desire to utilize, retailer's site 162 to generate content in association with the obtained product.

To allow these types of people, among other types, to provide user-generated content with respect to a particular product, manufacturer's site 132 or retailer's site 162 can provide the ability for a user to generate content with respect to the manufacturer's products. In other words, a user may use the manufacturer's site 132, retailer's site 162 or these other means, to generate user reviews, ratings, comments, problems, issues, question/answers, or almost any other type of content regarding a product, brand or manufacturer, usually regardless of where the user purchased the manufacturer's product.

In one embodiment, the user generated content which may be generated at a retailer's site 162 or manufacturer's site 132 may include reviews, stories, question/answer content or any other type of content in any format which the user wishes to add regarding a product, category of products, brand or service (collectively referred to as a product herein). Reviews may correspond to a user evaluation of a product and include ratings of product (for example, a number of stars or numerical rating), pros and cons of the product, a descriptive title and a description of a user's experience with a product (referred to as the body of the review), attributes of the user generating the review (for example, demographic information), other product(s) which compliment or may be used with the product being reviewed, pros and cons of the product or any other type of evaluation of a product or aspects of a user's experience with the product. Ask/Answer content may comprise questions or answers submitted by a user, retailer or manufacturer concerning a potential purchase decision, for example regarding the capabilities or use of a product or category of products, demographic information on a user generating a question or answer. Stories may be user generated content which may pertain to open ended experiences with one or more products or categories of products which may be more tangentially related to the product than, for example, reviews.

As the amount of user-generated content associated with a product at a retailer's site 162 may greatly affect the sale of that product (both at that site 162 and off-line purchases as well), it may be desirable to both manufacturers 130 of a product and retailers 160 who sell that product that any user-generated content created in association with that product be displayed in conjunction with that product on a retailer's site 162 (which may increase revenue for both a retailer 160 and a manufacturer 130 of the product).

Content distribution system 120 may therefore be coupled to network 170 and serve to distribute content generated at retailer's site 132, manufacturer's site 162, or another location, to retailers' sites 162 which offers these products or categories of products for sale such that the content generated by a user with respect to that product or category at the retailer's site 162 and the manufacturer's site 132 is incorporated into that retailer's sites 162 where the product, or category of product, is offered. Thus, content distribution system 120 allows content generated at a particular retailer's site 162 to be combined with content generated at the manufacturer's site 132 (or another site) and incorporated into that retailer's site 162 in conjunction with that product, category, brand, etc. Additionally, content distribution system 120 allows content to be distributed to many retailers 160.

By centralizing the distribution, incorporation and analysis of this user generated content a number of technical advantages may be achieved, especially with regards to the processing (including analysis), storage and distribution of such user generated content, including the moderation of such user generated content and the formatting of such user generated content for incorporation in the sites 162 of retailers 160. Additionally, this centralization may allow for easier correlation of user generated content with manufacturers, products or categories; statistical analysis of such user generated content and the presentation of such statistical data to the manufacturers.

Furthermore, such a centralized distribution system may have a number of business advantages. For example, as the sale of their products is important to manufacturers 130, these manufacturers 130 may pay operators of content distribution system 120 for formatting or distributing the content to the retailer's sites 162. This is in contrast to the usual payment flows where the retailer 160 gets paid for displaying advertising, or content aggregators getting paid by portals who display the data and who in turn charge manufacturers 130 for lead generation. Similarly, since the incorporation of user-generated content may also drive off-line purchases (after reading reviews at a site 162 a potential purchaser may drive to a physical store to make a purchase of that good) payment may be made by a manufacturer 130 or retailer 160 irrespective of where the product was purchased (for example, on-line versus off-line purchases).

As discussed above, it may be desired by operators of manufacturer's site 132 or retailer's site 162 that the incorporated user generated content be exposed to indexers for search engines in conjunction with the web page on which it is included. In many cases the methodology utilized to incorporate content from content distribution system 120 into a retailer's site 162 may make exposure of such content to these search engine indexers difficult.

Specifically, in some cases, the content from content distribution system 120 may be incorporated into an area of a web page of retailer's site 162 using a <div> tag (or another type of HTML element or tag (e.g. an <iframe>), or another type of mechanism) which works in conjunction with a software application associated with content distribution system 120 (such as JavaScript or other set of computer readable instructions) included on the web page or at the computing devices providing retailer's site 162 that is used to make calls back to the content distribution system 120 to incorporate the desired content for that page.

In certain embodiments then, when a web page of retailer's site 162 is loaded on a browser at a user's computer 110 the web page includes a script or other mechanism (e.g. JavaScript or asynchronous JavaScript and XML (AJAX), ActiveX, etc.) by which a request for user generated content for the web page is made to the content distribution system 120. In response to the request, the content distribution system 120 may return appropriate content (including user generated content) to the user's computer 110 for incorporation into the rendered web page.

As the user generated content to be displayed on the web page of the retailer's site 162 is actually provided by content distribution system 120 (or from any other source) in response to a request caused by execution of a software application during the rendering of the page by the browser it may not be exposed to a search engine indexer when such a search engine indexer accesses the web page. This is because these search engine indexers may not have the ability to index user generated content included based on a response to the request as the content may be included in such a manner that it is invisible to such search engine indexers because, for example it may be created at the content distribution system 120 and included in a container on the web page loaded at the user's computer 110 using JavaScript, AJAX or the like, or such search engine indexers may not execute software applications such as JavaScript in an accessed web page.

Thus, as discussed above, it is desired to provide such content on a web page in a manner which will allow such content to be indexed by search engine indexers. Part and parcel with this desire however, is the potentially competing desire to present the freshest content in conjunction with each access to a particular web page. Embodiments as presented herein may reconcile this potential conflict and allow both of these desires to be met. Before continuing, however, it will be helpful here to discuss content distribution system 120 in more detail.

Content distribution system 120 may include one or more computers communicatively coupled to a network 170 and a data store 122. Data store 122 may comprise user generated content 126, catalogs 128 and retailer filters 125. User generated content 126 may be associated with one or more products or categories, where this user generated content may have been generated at manufacturer's site 132, retailer's site 162 or at another location altogether.

Retailer filters 125 may be one or more filters to be applied in the selection of content to be incorporated into the web site of a retailer. A retailer 160 may have one more associated filters that may be applied by content distribution system 120 when determining user-generated content for incorporation into the web site 162 of that retailer 160. The filters 125 associated with a particular retailer 160 may be, for example, configured by an operator of that retailer's web site 162 using an interface provided by the content distribution system or may be specified by the retailer to the operator of the content distribution system 120 who may then configure the retailer filters 125 for that retailer; or the retailer filter 125 may be configured by some other method entirely. Such retailer filters 125 may include, for example, an initial amount of user-generated content, a subsequent amount of user-generated content, an initial sort order or a subsequent sort order (as discussed above), or other filters desired by the operators of a retailer's web site.

Catalogs 128 may comprise a set of catalogs, each catalog corresponding to a retailer 160 or manufacturer 130. A catalog may comprise a set of category identifiers utilized by the retailer or manufacturer, where each category identifier may be associated with one or more product identifiers and each product identifier may be, in turn, associated with a brand name, a product name, or any number of other desired attributes. A catalog may, for example, comprise one or more files of eXtensible Markup Language (XML). These catalogs 128 may be received from retailer 160 or manufacturer 130, for example over network 170, at a regular or semi-regular basis. For example, catalogs may be received nightly from retailer 160 or manufacturer 130. It will be apparent that each retailer or manufacturer may provide its catalogs at different times, according to different time periods or schedules, irregularly, etc.

Catalogs 128 may also comprise one or more catalogs generated from catalogs received from retailers 160 or manufacturers 130. For example, in one embodiment a global catalog associated with each manufacturer 130 may be created by consolidating portions associated with that manufacturer 130 from each catalog received from retailers 160 with any catalogs received from that manufacturer 130. A global catalog may, for example, comprise a set of global categories and associated global products identifiers where product identifiers and category identifiers used by the retailers for corresponding categories and products may be associated with these global identifiers.

In one embodiment, a global identifier may be associated with product information from each of a set of matched products consolidated from each of the retailer or manufacturer catalogs. For example, a global identifier for a product may be associated with a set of product identifiers that are used for the product by manufacturers 130 or retailers 160. As a product is added to the global catalog or a product's information is updated, the name of the category from each retailer may be associated with the global identifier for the product. A product can be associated with multiple categories. An interface may be is provided for administrators to add, combine and rename categories. For example, a product could be in the "LCD Monitors" category in one retailer and "19 inch Monitors" for another retailer. This product would get added under both categories in the global catalog. A user, could, if desired choose to consolidate these two categories into, for example, a "Monitors" category.

Content distribution system 120 may also include a content distribution application 150 which comprises interface module 152, moderation module 154, a matching module 156 an event handler module 178 and an incorporation module 158. Moderation module 154 may moderate (for example, filter or otherwise select), or allow to be moderated, content which is, or is not to be, excluded or included, while matching module 156 may serve to match received user generated content with a particular product or category. In one embodiment, this matching process may be accomplished using catalogs 128.

Incorporation module 158 may be configured to incorporate a tool for the generation of content into a manufacturer's portal, or a retailer's or manufacturer's site. Furthermore, incorporation module 158 may be used to incorporate user generated content into a retailer's site 162, or other site, for display to a user. In particular, a user may generate content regarding a product or category at manufacturer's site 132 or retailer's site 162 (or another site) using a content generation tool (for example, a GUI, webpage, widget, etc.) presented on the site. This tool may be implemented or developed by operators of content distribution system 120 and provided for use with the site to facilitate the generation of content by users, or the subsequent processing, distribution and incorporation of such content by content distribution system 120. These tools may be hosted by incorporation module 158 of content distribution system 120. Thus, for example, on a page of retailer's site 162 a content generation tool may be included, such that the tool hosted at content distribution system 120 may be incorporated in the site 162 for use by a user at the site 162.

Such content generation tools can be distributed throughout a retailer's or manufacturer's (or other's) site. For example, these content generation tools may be included on a site's product pages as well as the category pages which help to organize the product page, or any other pages where it is desired to allow a user to generate content. Thus, such a content generation tool may be advantageously employed to allow content to be generated in the context of the product page or category page on which it was deployed. So, for example, if a content generation tool is deployed on a television product page, reviews associated with that television product may be received that are different than a review of a wool sweater generated using the content generation tool deployed on the product page for the wool sweater.

In any event, the content generated by the user with respect to a product or category may be received by content distribution system 120 and stored as user generated content 126 in association with one or more identifiers. One identifier may be a unique identifier assigned by content distribution system 120 such that each piece of received user generated content may be uniquely identified. Another identifier may be timestamp indicating the time at which such content was received at the content distribution system 120. Still another identifier that may be associated with received user generated content is a site of origin. This site of origin may identify the web site at which the user generated content was generated or the web site from which the user generated content was received. This site of origin may, for example, be a domain, subdomain or localization of a domain (e.g. orbitz.com may be considered a different site of origin than oribitz.co.uk or orbits.es).

Other identifiers may be utilized to associate the content with one or more web pages (which may, for example, be associated with that product or category) or another entity such as a section of a web site, multiple web sites, a product, a category, a brand, etc. Such an identifier may serve to group a set of content (which may have been generated at multiple retailer's or manufacturer's web sites) together so that it may be displayed in one location (for example, on a product page, a category page, or particular section of a site, etc.). Accordingly, an identifier may represent an actual product in the traditional sense of the word, a category comprising a collection of products or categories, a brand, or simply a particular container, page, or section of a site, including the entire site, itself or multiple web sites, and serve to group a set of content.

The received content may be moderated by moderation module 154, to determine if such content should be utilized for display on a site, or may be edited for suitability. This moderation process may comprise different levels of moderation, including auto processing the user generated content to identify blacklisted users or trusted users; human moderation which may include manually classifying content or content recategorization; proofreading; or almost any other type of moderation desired. Note, however, that such moderation may or may not be employed in certain embodiments. For example, content from certain manufacturers may not undergo such a moderation process, or may undergo moderation at a different point.

In one embodiment, this moderation process may also comprise associating identifiers with the received user generated content as discussed. These identifiers associate this user generated content with a manufacturer, products, brand or categories of products offered for sale by retailer 160 or the manufacturer 130, a user attributes of the user who generated the content, product attributes, etc. Thus, for example, received user generated content may be associated with a product identifier associated with a particular product or a category identifier associated with a particular category and the content and the associated identifiers stored in data store 122.

At least a portion of these associations may be determined using matching module 156 which may compare data received in conjunction with the user generated content (for example, product data, category data, user data, etc.) with data in a catalog 128. Once it is decided that the user generated content is to be stored in data store 122 and allowed to be disseminated (for example, has been moderated), event handler 178 may take certain actions based on the user generated content or its associated data, such as emailing a user, sending alerts to a manufacturer that new content regarding one of its products has been received, etc. These events may be tailored to the type of content generated or other attributes of the content.

Accordingly, a user shopping at, for example, retailer's site 162 may access a web page or other portion of the site 162 corresponding to a particular product or category. User generated content 168 associated with that product or category may be displayed on a user's browser such that a user viewing a portion of the retailer's site associated with a particular product or category may have user generated content 168 associated with that product or category displayed to him. This user generated content, may, for example, have been originally generated at the retailer's site 162, through the manufacturer's site 132 or at another site. Thus, the display of this user generated content to the user while he is shopping, may, in turn, motivate the user to make a purchase through retailer's site 162.

Both the user generated content displayed on the web page and a content generation tool for the generation of new content may be provided in conjunction with one another. Specifically, in one embodiment, the content from content distribution system 120 or a content generation tool may be incorporated into a portion of the web page of retailer's site 162 using an element such as an iframe or div tag, another type of HTML element or tag, or another type of mechanism altogether, and may be accessed through a variety of elements, such as a tab or link displayed on the web site or the like.

More particularly, in one embodiment, an inclusion module 164 (such as JavaScript or other type of computer instructions) may be included at the retailer's site 162 or associated with a particular web page of the retailer's site. This content distributor inclusion module 164 works in conjunction with incorporation module 158 of content distribution system 120 by making calls back to the incorporation module 158 on content distribution system 120 to incorporate the desired content for that page along with a content generation tool.

In one specific embodiment, when a web page 166 from retailer's site 162 is loaded at a user computer 110 the HTML for the page may load, including the element used to incorporate content from the content provider system 120. A content distributor software module 164 (which may have been provided by operators of the content distribution system 120 or implemented by operators of the retailer's site 162) may also load at this time to access incorporation module 158 to obtain user generated content (e.g. reviews, stories, etc., as discussed above) for inclusion in the web page 166 in conjunction with the element such that the obtained user generated content can be displayed in the web page 166 of the retailer's site.

In one embodiment, the content distributor software module 164 associated with content distribution system 120 resident on retailer's site 162 may be executed when the web page 166 is loaded. This content distributor software module 164 may send data associated with the web page 166 such as the product data, user data, display codes, etc. to incorporation module 158. Incorporation module 158 may utilize this data to determine a set of user generated content 168 from the stored user generated content 126 to return, format this user generated content 168 accordingly and return this user generated content to the calling content distributor software module 164.

The content distributor software module 164 executing on the browser at the user's computer 110 receives content from the incorporation module 158 and incorporates the content into the element on the web page 166 configured to display the content. Moreover, the ability to generate additional content may be offered, where the type of content generation opportunity offered may correspond to the type of incorporated content. For example, the opportunity to generate an additional review may be presented along with reviews that have been incorporated in the web page 166 at the retailer's site 162.

As can be seen then, by calling content distribution system 120 to obtain user generated content 168 for display in a web page when that web page is rendered by the browser at the user's computer 110 a number of advantages can be obtained. One substantially important advantage is that the content retrieved from the content distribution system 120 by the content distributor software module 164 is fresh. In other words, content recently received by the content distribution system 120 may be included on a web page 166 without alteration to the web page 166 itself. Part and parcel with this, the format or appearance of such user generated content may be altered without alteration to the code that comprises the web page itself.

However, because the content to be displayed on the web page 166 of the retailer's site 162 is actually provided by content distribution system 120 using a content distributor software module 164, such content may be not be indexed by a search engine indexer accessing such a web page because, for example, the content distributor software module 164 may not be executed by the search engine indexer or the search engine indexer may be configured not to index content incorporated using such software modules. Thus, it may be desired to expose such content to search engine indexers in conjunction with such a web page while still retaining the advantage offered by embodiments of the systems and methods presented herein.

In one embodiment, this may be accomplished by building a mirror site for each retailer's site 162. Thus each retailer 160 would have a web site 162 with commerce enabled pages for each product/category (e.g. web pages through which purchases could be made) and a mirror site in which the user generated content is incorporated into web pages in such a way that they are exposed to search engine indexers (for example, including the user generated content in the HTML which comprises the web page itself). For example, each commerce enabled page for a product/category may have a corresponding page in the mirror site in which all or a substantial portion of user generated content associated with that product/category is incorporated in the code comprising that web page such a manner that it is exposed to the search engine indexer.

This embodiment may have certain less than ideal characteristics. First and foremost, in this embodiment the web pages that are indexed may be the web pages of the mirror site. Thus, it may be these mirror pages (and not the commerce enabled pages) that are exposed to the user when the user searches using the search engine. Consequently, a web page returned using a search engine may be the page of the mirror site and a user may access the web page of the mirror site as opposed to the commerce enabled page associated with product/category.

While the two web pages (mirror web page and corresponding commerce enabled page) may be linked, this one extra link may cause a significant reduction in the number of users who actually land on the commerce enabled page or make purchases through the commerce enabled page. Additionally, as most search engine algorithms give some amount of weight to the freshness of content, as user generated content is changing often it is desired that the user generated content be exposed to search engine indexers though the commerce enabled page itself, to provide a mechanism for increasing the freshness rating of the commerce enabled page.

Furthermore, most search engine indexing algorithms utilize some form of weighting based on content richness (e.g. keyword density). For a product page, an operator of a site may desire to target a few keywords (product name, brand, etc.) such that a web page will show up in a search for those few targeted keywords. In many cases, the pages of a mirror site will compete against their corresponding commerce enabled pages with respect to the search engine indexer (e.g. both pages may be indexed according to the target words and links to both these web pages may be presented to a user as a result of a search comprising one or more target keyword).

Figure 7:
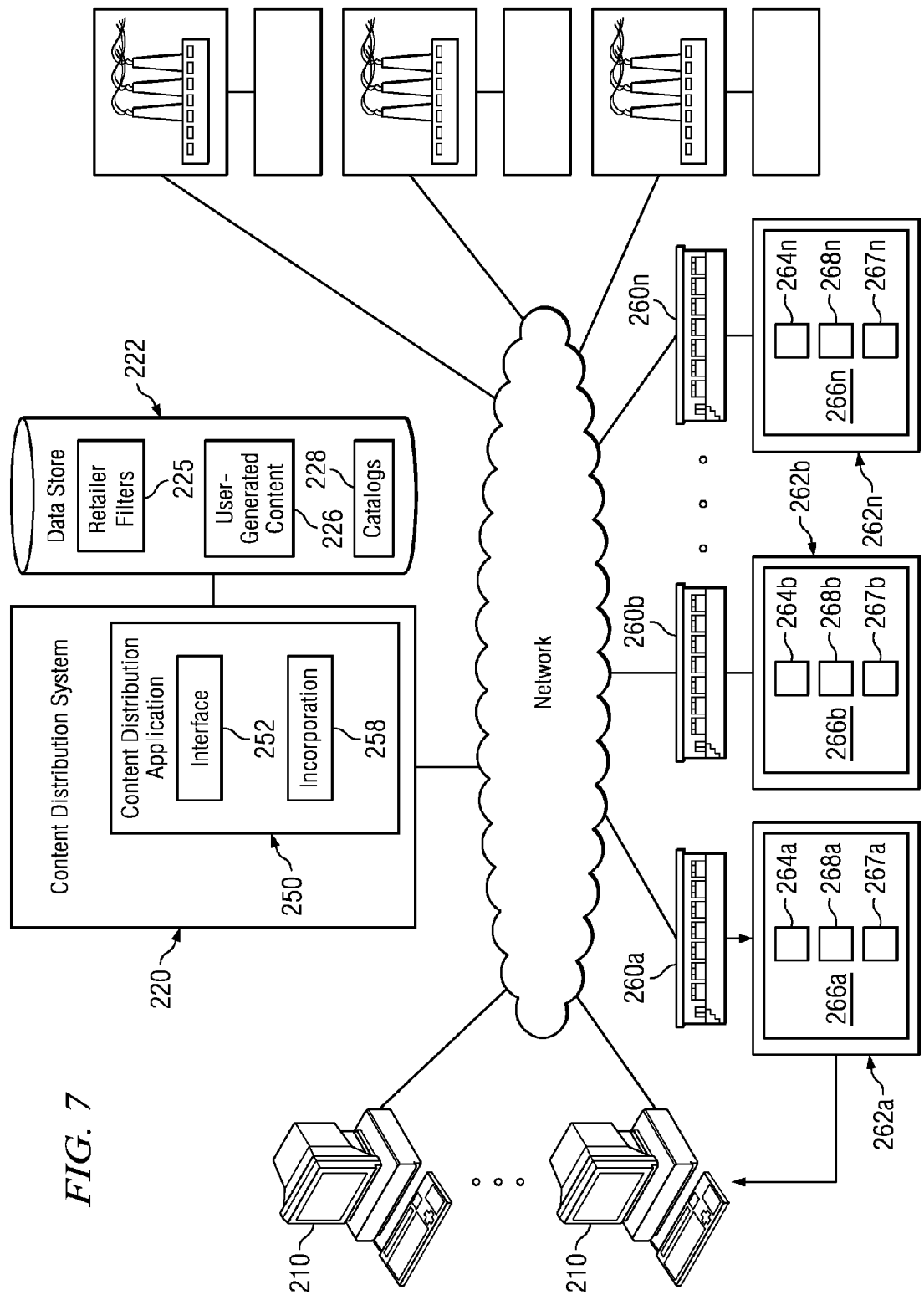
FIG. 7 is a block diagram of one embodiment of an architecture in which a content distribution system may be utilized.

Accordingly, embodiments of other methods for the exposure of user generated content to a search engine indexer in conjunction with a commerce enable page have been developed. Turning to FIG. 7, one embodiment of one embodiment of a content distribution topology including one embodiment of a content distribution system is depicted.

In one embodiment, user generated content from the content distribution system 220 may be incorporated into the commerce enabled (or other types of) web pages of a web site using a container in the web page as described above. This container may be for example, defined by a <div> tag. More specifically, as discussed above, when web page 266 from a retailer's site 262 is rendered by a browser at a user's computer 210 a content distributor software module 264 may be executed which sends a request to content distribution system 220 for user generated content to include in the web page 266. The user generated content 268 is returned by the content distribution system 220 and displayed in the container by the content distributor software module 264.

In addition, to ensure user generated content is exposed to a search engine indexer user generated content 267 associated with that web page 266 may be incorporated into the source code that comprises the web page. In other words, when the web page is created by the operators of the retailer's site 262, user generated content 267 associated with the web page (e.g. user generated content for the product, category, brand, etc. associated with the web page) may be included within the <div> tag comprising the container. In this manner, a search engine indexer may be able to index this user generated content in association with the web page 266 as it is included in the actual code comprising web page.

Furthermore, if the content distributor software module 264 is able to execute, a request to the content distribution system 220 may still be sent and the user generated content 268 returned from the content distribution system 220 may be displayed instead of the user generated content 267 incorporated into the code of the web page 266 when the web page 266 loads on a user's computer 210. As can be seen, embodiments such as these may provide the benefit of allowing user generated content 267 to be indexed by search engine indexers while still allowing the freshest user generated content 268 to be presented to a user in conjunction with a user's access to that web page. As an added benefit, if for some reason JavaScript or code execution is turned off in the user's browser the user generated content 267 incorporated in the code of the web page 266 may still be displayed to the user when the web page 266 is rendered.

It will be noted that other embodiments may employ similar techniques. For example the content distributor software module 264 may be incorporated into a web page using a <script> tag or other mechanism. Here, a <noscript> tag (e.g. and matching </noscript> tag to make a <noscript> block) may be included in the web page. User generated content may be incorporated into the code of the web page within this <noscript> block.

To illustrate one embodiment in more detail: at some time interval a file comprising appropriate user generated content 267 may be sent from content distribution system 120 to the computing devices providing retailer's site 262. This type of content distribution may include, for example, those methods of content distribution that employ server-side transfer methods and transfer content independently or in aggregate form such as in zipped files, where this transfer may either be done real-time, for each server request (e.g. from servers providing the retailer's site 262), or may be batched on a schedule for example, hourly or daily. This type of content distribution may utilize a collection of methods or script instead of, or in addition to, any HTML markup that may be provided either together or separately via the same or different content distribution methods.

For example, the file provided from content distribution system 220 may comprise a zip file comprising compressed appropriate user generated content indexed by one or more catalog identifiers (as discussed earlier) associated with the retailer 260 to which the file is being provided such that user generated content associated with a product or category may be identified using an identifier for the product or category utilized by the retailer 260. In one embodiment, incorporation module may obtain a catalog 228 associated with the retailer 260 and determine a set of user generated content 226 associated with the identifiers of that retailer's 260 catalog using, for example, retailer filters 225. The determination of this set of user-generated content 226 may include the determination of user-generated content 226 associated with each of a set of web pages associated with an identifier. Thus, for each identifier, the retailer may have an associated set of web pages comprising an initial web page and one or more subsequent pages. Using, for example, retailer filters 125, user-generated 226 content can be determined for each identifier and the initial page and one or more subsequent web pages associated with each identifier.

The user generated content 226 associated with a particular identifier and each web page associated with that identifier can be formed as one or more .htm or .html files and stored using a pathname that is associated with the identifier or page. The set of files associated with each of the identifiers and web page can then be zipped or otherwise compressed such that when that file is decompressed the resulting file structure comprises each of the .htm files stored with a pathname associated with that identifier and a page of the set of web pages associated with that identifier.

Operators of retailer's site 262 may receive such a file and decompress the file. The operators of the retailer's site 226 can then use a script to locate a web page of the retailer's site 262, determine the identifier of the product or category associated with the web page and which page of the set of web pages associated with that identifier (e.g., initial web page, first subsequent web page, etc.), obtain the user generated content from the zip file associated with that identifier and page and integrate that user generated content into that web page within the <div> block (e.g. <div> tag and corresponding </div> tag) used in conjunction with content distributor software module 264, for example, by modifying the existing web page or generating a replacement web page. When a new file comprising user generated content is received from content distribution system 220 this process may be repeated, such that the web pages 266 of the retailer's site 262 may be modified or recreated whenever a file is received. By continually modifying or recreating these web pages the user generated content exposed to the search engine indexer in conjunction with the web page may be kept relatively fresh.

Accordingly, when a web page 266 whose source comprises user generated content is loaded at a user's computer, the user generated content of the web page included in the <div> block of the web page may be loaded or pre-rendered. However, in conjunction with the load of the web page (e.g. the <div> block of the web page) the content distributor software module 264 is also executed. When executed the content distributor software module 264 may hide the display of user generated content 267 included in the <div> block of the web page (permanently or for a certain amount of time) and send a request to the content distribution system 220 for user generated content. In response to this request, the content distribution system 220 may return user generated content 268 to the user's computer 210 which is loading the web page 266. The content distributor software module 264 may receive the user generated content 268 and overwrite user generated content 267 included in the <div> tag with the received user generated content 268 such that what gets displayed to the user viewing the web page is the user generated content 268 returned from the content distribution system 120.

In certain embodiments, the request sent from the user's computer 210 by content distributor software module 264 may comprise identifiers associated with the user generated content 267 incorporated in the <div> block of the web page 266. Specifically, each portion of user generated content 267 (e.g. an individual review, question or answer, story, etc.) may have an identifier assigned to it by content distribution system 220 when it is received by content distribution system 220. These identifiers may be associated with the portions of user generated content 267 incorporated into the <div> block of the web page 266. When this web page 266 is loaded the content distributor software module 264 may obtain the identifiers of the portions of user generated content 267 incorporated into the <div> block of the web page 266 and send these identifiers to the content distribution system 220 along with the request for user generated content identifying the web page for which the user generated content is requested.

When the content distribution system 220 (for example, the incorporation module 258) receives such a request a set of user generated content 226 associated with the identified web page may be determined and a number of actions may be taken. In one embodiment, the content distribution system 220 may attempt to locate appropriate user generated content which is newer (has been received more recently than) the user generated content 267 incorporated in the <div> block of the web page 266 using the identifiers of the incorporated content provided in association with the request.

If newer user generated content 226 is located, the content distribution system 220 may obtain this new user generated content and may deliver this new user generated content (and possibly other user generated content, including portions of user generated content that may or may not be associated with the identifiers provided in association with the request) to the content distributor software module 264 for inclusion in the web page 266. Thus, this delivered user generated content 268 overwrites the user generated content 267 included in the code of the web page 266 and is incorporated into the web page 266 displayed at the user's computer 210. In this manner, user generated content 267 may be included in the web page in the <div> block and exposed to certain search engine indexers in a more optimal manner while the freshest user-generated content 268 may still be exposed to the user viewing the web page.

Alternatively, if newer user generated content cannot be located based on these identifiers the content distribution system 220 may send back identical user generated content to what was included in the <div> block of the web page 266 or may take no action such that the content included in the <div> tag may be rendered and incorporated into the web page displayed at the user's computer 110 (e.g. after the time period for which content distributor software module 264 hides user generated content 267).

In one embodiment, there may be a parameter in the request sent by content distributor software module 264 that indicates that the content distribution system 220 is to return user generated content identical to the user generated content 267 included in the <div> block. This parameter may be set by operators of retail site 262 to ensure that any changes that they make (e.g. to a template associated with web page or the content included in the <div> block) may effectuated in the actual web page as displayed.

It may be helpful to an understanding of certain embodiments to illustrate such embodiment in more detail. Accordingly, attention is first directed to FIGS. 8A and 8B which depict, respectively, a flow diagram and a block diagram of one embodiment for providing user generated content to a retailer for inclusion in the source code of that retailer's web pages. At step 302 content generated by a user at a web site (e.g. the retailer's web site, a manufacturer's web site, etc.) may be received at a content distribution system.

The user generated content may be associated with one or more identifiers at step 304 and stored at the content distribution system. The identifiers associated with the content may be the identifier of a product or category received when the content was generated. Identifiers may also be assigned by the content distribution system when user generated content is received. Such identifiers may serve to uniquely identify each piece of user generated content (e.g. each review, question or answer, story, etc.) stored by the content distribution system. Other identifiers include timestamps and site of origin as discussed above.

Additionally, identifiers may be one or more identifiers provided by the operators of a retailer web site in a product or category catalog provided by the retailer. The identifiers in a catalog provided by the retailer may reflect the products or categories offered by that retailer and may similarly reflect the organization of the pages of that retailer's site such that the identifiers may be associated with a page of that retailer's site. For example, by associating an identifier from a retailer's catalog with a piece of user generated content it can be determined that the piece of user generated content is associated with a product or category and is appropriate for display on the associated page of the retailer's site.

At some time interval then (e.g. hourly, daily, weekly, bi-weekly, etc.) a retailer file of user generated content for a retailer is formed by content distribution system at step 306. The retailer file may be organized by type of user generated content (where there may be a separate file for each type of user generated content) and by the identifiers associated with pages of the retailer's site.

This process may entail determining an appropriate set of user generated content for each page of the retailer's web site on which it is desired to present user generated content. These pages may correspond to the identifiers provided by the retailer in the catalog provided to the content distribution system. Additionally, these pages may one of a set of web pages associated with a particular identifier (e.g. an initial web page, a subsequent web page, etc.) Thus, for each (i.e. all or some subset) of the identifiers in the retailer's catalog, and for each web page of the retailer's site associated with that identifier, a set of appropriate user generated content may be determined. A file comprising the user generated content for a particular page of the retailer's site, which may comprise one or more .htm files, may then be formed. The retailer file can then be formed from each of the page files.

Each of the page files for a retailer may be stored in the retailer file using a pathname that comprises the associated identifier of the page with which the file is associated. For example, if "HotelA" is an identifier for a product sold by a retailer and a corresponding page, the pathname for the page file associated with that identifier and page might be: reviews/HotelA/Reviews.htm. Similarly, if a retailer's web site comprises multiple pages associated with an identifier (e.g. an initial page and one or more subsequent web pages) the pathname may comprise an identifier of that page. To continue with the above example, if the product associated with "HotelA" has multiple web pages on the retailer's web site, the pathname for the page file associated with the initial web page for "HotelA" might be: reviews/HotelA/Reviews-Page1.htm, while the pathname of the first subsequent web page associated with "HotelA" might be reviews/HotelA/Reviews-Page2.htm, etc. The file for a retailer may thus be the set of page files for each of the identifiers, stored at a corresponding pathname. The retailer file can be compressed to reduce the amount of data or time it takes to communicate this file.

In one embodiment, the determination of the appropriate user generated content for a page of the retailer's site to include in the associated file for that page may employ the same methodology as is used to determine appropriate user generated content to return in response to a request from a content distributor incorporation module executing at a user's browser in conjunction with the rendering of that page. The determined set of user generated content can thus be thought of as a snapshot of user generated content which would be provided by the content distribution system for inclusion the associated page at the moment in time when such content is determined.

More specifically, a set of stored user generated content associated with the identifier may be determined. A set of filters can then be applied to the set of stored user generated content to refine this set of content. These filters may for example, remove or select content for inclusion in the set of content based on time of generation, site of origin, or other criteria. For example, the six to ten most recently generated pieces of user generated content may be selected for inclusion in the set of content for a page and all other user generated content removed from the set of content.

In particular, in one embodiment, retailer filters may be applied to determine user-generated content for inclusion in the appropriate set of user-generated content for a page. The retailer filters may include an initial sort order, an initial amount, a subsequent sort order, a subsequent amount, or other filters. If, for example, the page for which user-generated content is being determined is an initial web page and the retailer whose site includes that web page has an initial amount filter and initial sort order filter configured these will be used in determining the appropriate user generated content. To illustrate: suppose that a retailer has an initial amount of six and an initial sort order of "most recent" configured as filters. When determining appropriate user-generated content for an initial web page associated with an identifier the set of stored user generated content associated with the identifier may be determined. This content can then be sorted by time of generation and the six most recently created pieces of user-generated content (if available) selected for inclusion in the initial web page associated with that identifier.

Similarly, if the page for which user-generated content is being determined is a subsequent web page and the retailer whose site includes that web page has a subsequent amount filter and a subsequent sort order filter configured these will be used in determining the appropriate user-generated content. Continuing with the above illustration, suppose that a retailer has an subsequent amount of thirty and a subsequent sort order of "most helpful" configured as filters. When determining appropriate user-generated content for a subsequent web page associated with an identifier the set of stored user generated content associated with the identifier may be determined. This content can then be sorted by helpfulness and the thirty most helpful pieces of user-generated content (if available) may be selected for inclusion in the subsequent web page associated with that identifier.

Another filter that may be applied in the determination of user generated content for a page may be a syndication delay filter. Such a syndication delay filter may serve to provide user generated content only to the site of origin for a particular time period. The use of a syndication delay may be desired because of the manner in which some search engine indexers operate. Many such search engine operators understand that user generated content may be generated at one site and displayed at one or more other sites (this is sometimes referred to as syndication of content). The algorithms used by these search engines to index web pages thus attempt give more weight to the content in conjunction with the site where such content was originally generated. Thus, for example, if content was generated by a user through a page offered by bestbuy.com and syndicated to a variety of other sites, certain search engine algorithms may give greater weight in an algorithmic analysis of the content in association with its inclusion on web pages in the bestbuy.com domain as opposed to any of the web pages in domains of the other sites. Being the site of origin for content may increase the ranking of that site by these types of search engines which may, in turn, result in the web site (or a web page within that web site) being exposed as a result of a search using that search engine.

Accordingly, in many cases, operators of web sites where content was originally generated may desire for this to be taken into account when web pages of their site are indexed or ranked. In some cases, however, it may be difficult for search engines or search engine indexers to determine the site of origin for various content, including user generated content, as such content may be syndicated to many web sites relatively quickly after it is generated and search engine indexers may not process web sites in a particular order. A syndication delay filter can be employed to allow the distribution and syndication of user generated content while improving the ability of search engines or search engine indexers to more easily determine the site of origin for such content.

A syndication filter may impose a delay between the reception of user generated content from the site of origin and the syndication of this content to web sites other than the site of origin. Each potential web site of origin can designate a syndication delay time period which may for example comprise a time period of 7 to 10 days. User generated content may not be syndicated to any site other than the site of origin for the syndication delay time period associated with the site of origin.

In other embodiments, a syndication delay time period may be designated by a site other than a site of origin. Here, user generated content may not be syndicated to that site if it was generated within the syndication delay time period associated with that site. Allowing receiving sites to designate a syndication delay may be useful in situations where multiple sites are owned and managed by a single group. For example, orbitz.com owns five sites, which are all managed by one central group of people.

Figure 10:
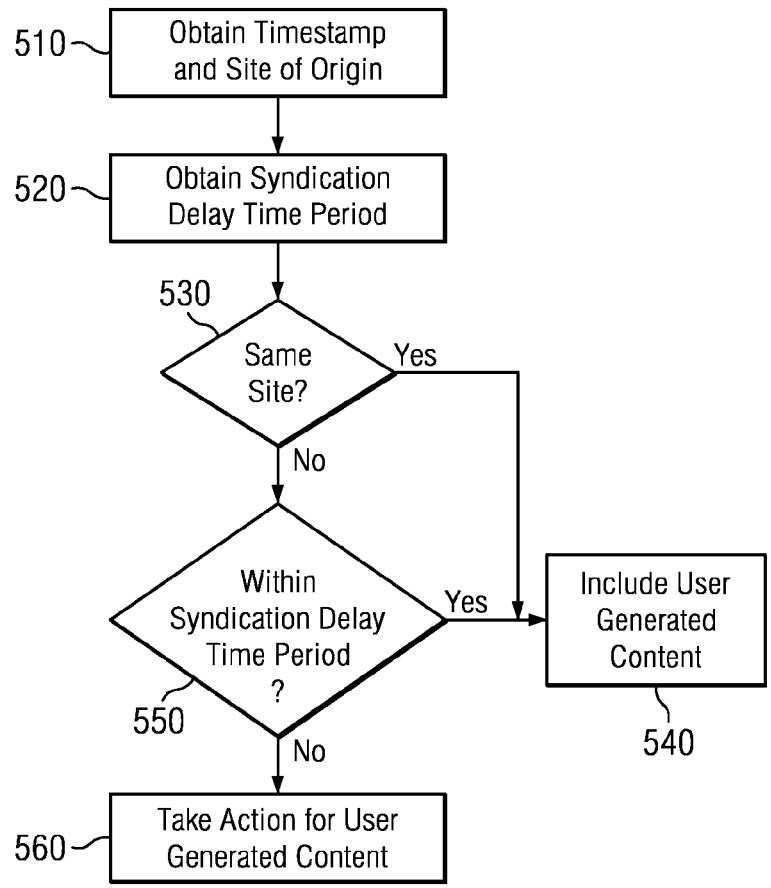
FIG. 10 is flow diagram of one embodiment of a method for implementing a syndication delay.

The application of one embodiment of a syndication delay filter to a piece of user generated content may be illustrated with reference to the flow diagram of FIG. 10. When the syndication filter is applied to a piece of user generated content determined for a particular web page the site of origin and timestamp associated with each piece of user generated content may be obtained at step 510. If the site of origin for the user generated content is the same as the site associated with the web page for which the set of user generated content is being determined (for example, the retailer's web site that comprises the page) the user generated content can be included in the set of user generated content determined for the page at step 530.

Alternatively, if the site of origin for the piece of user generated content is not the same as the site of the web page it can be determined at step 550 if the content was generated within the syndication delay time period. In particular, using the current time it can be determined if the user generated content was received from the site of origin within the syndication delay time period associated with that site of origin (e.g. if an operator of a web site specified a 7 day syndication delay time period and the user generated content determined was generated at that web site it can be determined if the user generated content was generated within the last 7 days).

If the user generated content was not generated within the syndication delay time period (e.g. was generated greater than 7 days ago) it may be included in the set of user generated content determined for the page at step 530. If, however, the user generated content was generated within the syndication delay time period a variety of actions may be taken at step 560. For example, the user generated content may be removed from the set of content determined for that page. In some embodiments, in addition to the removal of such content, another piece of user generated content to be included in the set of user generated content may replace the user generated content in the set of content determined for the page, where this newly determined content falls outside the syndication delay time period, etc.

Returning now to FIG. 8A, the set of user generated determined after the application of any filters can then be included in the page file associated with the identifier. In one embodiment, in addition to the determined user generated content the content of such a file may include additional markup language or other code. Such additional markup language or other code may provide a particular format to the user generated content when it is rendered, may be additional code which it is desired to include to supplement the user generated content (e.g. to provide interactivity, page links, additional descriptions, etc.) code for hiding certain portions of the included user generated content when it is rendered by a browser, etc.

For example, it may be the case that a particular retailer would like content to be displayed with full formatting according to their site's format. In such cases the included user generated content may be fully "decorated" with HTML when it is included in the file for that retailer. For example, in these cases the included user generated content may be formatted similarly to what would be returned by content distribution system in response to a call from the content distributor incorporation module. Alternatively, other retailers may desire, or not care if, such included user generated content is formatted in the event it is displayed. In these cases, the selected content may be left undecorated, or a minimal amount of HTML may be included with the selected content in the file for those retailers. The user generated content may also be formatted according to one or more schemas that may be effectively processed by search engine indexers. Examples of such schemas include for example, microformat, microdata, hReview, hReview-aggregate, RDFa, etc.

As discussed above, in many cases the file content included in a page file will be included by a retailer in the source code of the associated web page. However, when such a web page is rendered this file content may be overwritten with new content obtained from the content distribution system. Accordingly, then, to prevent the momentary display of the included file content before it is overwritten (sometimes referred to as flashing) or for other reasons, it may be desired to prevent the display of the file content included in the source code of the web page when the web page is rendered and before the included file content is overwritten with the content obtained from the content distribution system. In order to effectuate this, code (e.g. JavaScript, ActiveX, etc.) may be included in the .htm file that will serve to hide the file content that includes the selected user generated content for a time period.

The use of code to hide the file content may, however, effect the processing of such file content by search engine indexers. For example, it may be desired to include page links in the file content in addition to the selected user generated content, where these page links may be links to additional user generated content. Normally then, if the source code of a web page which included these types of page links was processed by a search engine indexer the user generated content associated with those page links would get indexed in conjunction that web page. However, if the search engine indexer detects that such page links are hidden (e.g. detects code that hides such page links) the user generated content associated with these page links may not be indexed by the search engine indexer.

Accordingly, when forming the file content for inclusion in the file it may be desired to format such file content such that if such file content were rendered by a browser some portions of the file content would be hidden while other portions of the file content would not be hidden. Portions of file content may be configured to be hidden or rendered based on a desire to have such file content indexed by a search engine indexer when included in the source code of a web page, or may be based on other criteria.

To hide certain portions of the file content while other portions are rendered, portions of the file content may be included in a corresponding <div> block of the file content. The code included in the file content which is configured to hide content may be configured to hide only those particular <div> blocks that include file content that it is desired to hide. Thus, <div> blocks that include code that it desired to have rendered will be rendered.

To continue with the above example, suppose that it is desired to hide the user generated content of the file content while leaving the page links in the file content exposed. Here, the file content may comprise two <div> blocks, one <div> block with an identifier of "reviews" and another <div> block with an identifier of "pagination". The selected user generated content may be included in the "reviews"<div> block while the page links may be included in the "pagination"<div> block. Code included in the file for a retailer may be configured to hide only the "reviews"<div> block when a web page including the file content is rendered thus leaving the page links in the "pagination"<div> block to be rendered. It will be noted here that the same methodology may be employed to hide or show any desired portion of the file content and that as search engine algorithm requirements change, it may be desired to render and display some content before it is overwritten, including, for example, pagination links, summary information, such as aggregate review data, reviews, questions, answers, other forms of user generated content, links to content author profiles, links to media or embedded media, such as photos or videos or other types of content.

Figure 8A:
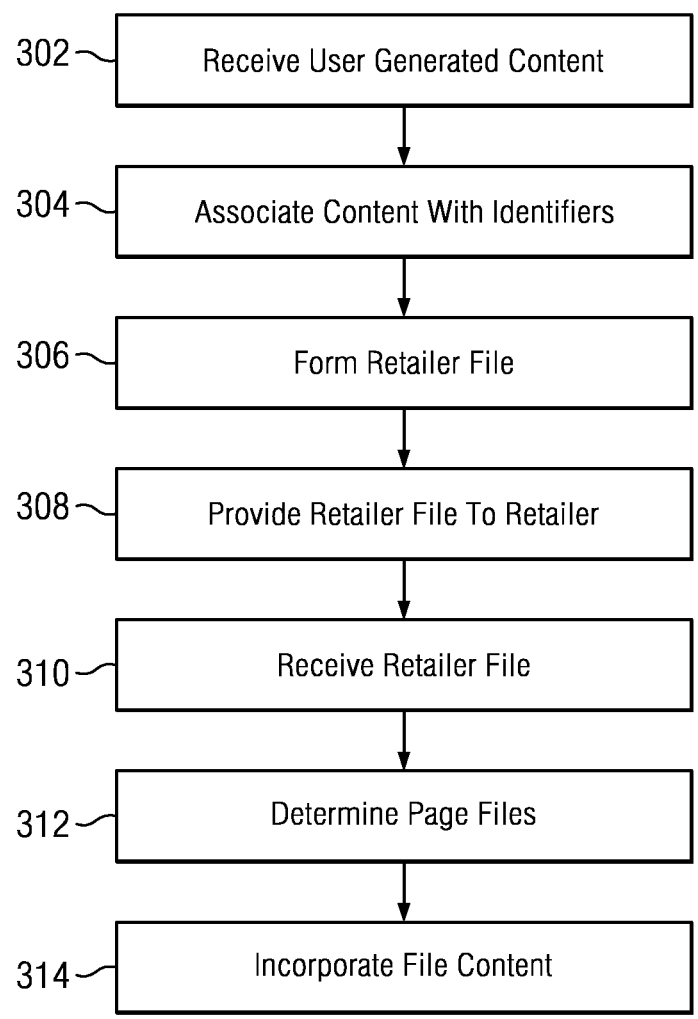
FIG. 8A is flow diagram of one embodiment of a method for utilizing content.

Referring still to FIG. 8A, once the retailer file is formed it may be provided to the retailer at step 308. The retailer may receive the retailer file from the content distribution system at step 310. The retailer can then decompress the file if needed and parse or otherwise process the file at step 312 to determine the page file(s) in the retailer file associated with each of one or more of their web pages. As noted above, each page file in the retailer file may be stored according to a path name that comprises an identifier associated with an associated web page of the retailer. Accordingly, by using an identifier of one of their web page the retailer may be able to locate the page file associated with that web page in the retailer file.

The retailer file can then incorporate the file content of the located page file into the source code of the associated web page at step 314. For example, the web page may be regenerated with the file content included or the file content may be inserted into an existing web page. In one embodiment, the file content may be incorporated within the associated web page in a container defined using a <div> block. The <div> block may have a particular identifier (e.g., <div id="bvrrcontainer">) where that identifier may be unique within that web page (e.g. no other container or tags of the web page may be assigned that identifier) such that a content distributor incorporation module may be able to identify the container that includes the file content using this identifier and overwrite at least a portion of the file content included in that container (as discussed above).

It will be noted here that while providing such file content to the retailer in a retailer file may be desired by various retailers, other retailers may desire that such file content be provided via other methods. Thus, it should be understood that such file content may be provided to a retailer via a variety of channels such as an eXtensible Markup Language (XML) data feed, a storage medium such as a DVD, etc., and retailers may similarly use an appropriate method for the incorporation of this file content into their web pages, without loss of generality.

Figure 8B:
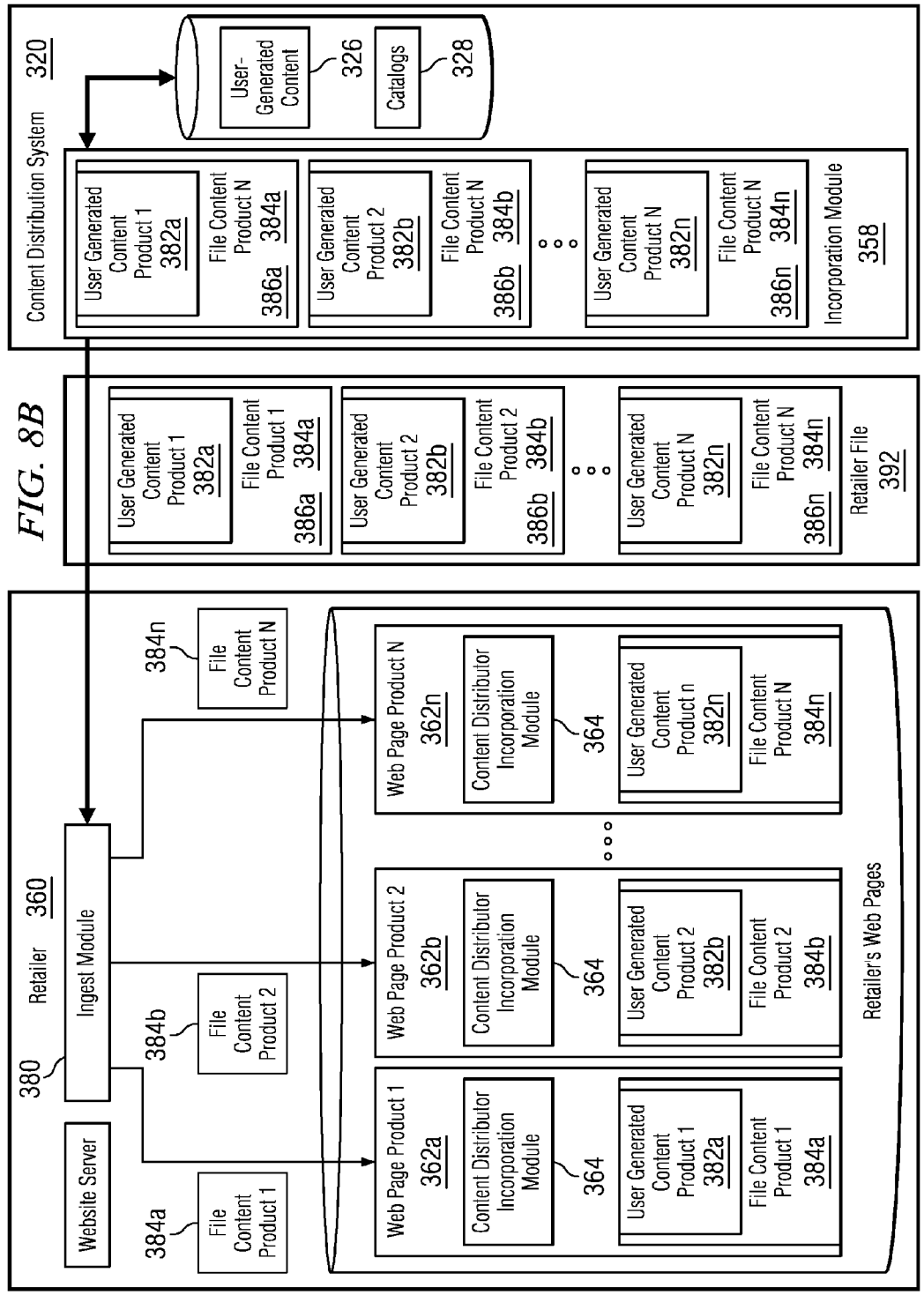
FIG. 8B is a block diagram of one embodiment of the inclusion of content.

Moving now to FIG. 8B, a graphical depiction of an example of one embodiment for providing user generated content to a retailer for inclusion in the source code of that retailer's web pages is depicted. As discussed above, at some interval incorporation module 358 of content distribution system 320 may create retailer file 392 for a particular retailer 360. To create the retailer file 392 incorporation module 358 may determine a set of identifiers associated with the retailer 360 using the catalog 328 associated with that retailer 360. Assume for purposes of this example that such identifiers are associated with products offered for sale by the retailer and corresponding web pages 362 provided through the web site of the retailer 360.

Using the identifier for each of the products, appropriate user generated content 382 from user generated content 326 may be determined. This user generated content 382 is part of the file content 384 included in the page file 386 for an identifier and associated web page. Each of these page files 386 is included in the retailer file 392 in association with that identifier and the retailer file 392 is then sent to the retailer 360 (e.g. one or more computing devices associated with the retailer).

The retailer 360 may receive the retailer file 392 and process the retailer file 392 using an ingest module 380. This ingest module 380 may be configured to process the retailer file 392 to determine the file content 384 associated with each of the one or more web pages 362. The ingest module 380 may be further configured to incorporate the appropriate file content 384, including the user generated content 382, into each of the respective web pages 362. Thus, the source code of each web page 362 may include the user generated content 382 and other file content 384 provided by the content distribution system 320 in the retailer file 392. Accordingly, this file content 384 (including the user generated content 382) will be indexed in association with the respective web page 362 when that web page 362 is indexed by a search engine indexer.

Furthermore, a content distributor incorporation module 364 may be included in the retailer's web page 362, where the content distributor incorporation module 364 may include code such as JavaScript that is configured to, when executed by a browser rendering the web page 362 at a user's computer device, contact the content distribution system 320 and request user generated content. Embodiments of such content distributor incorporation modules have been discussed in detail above and will additionally be discussed later herein.

Figure 8C:
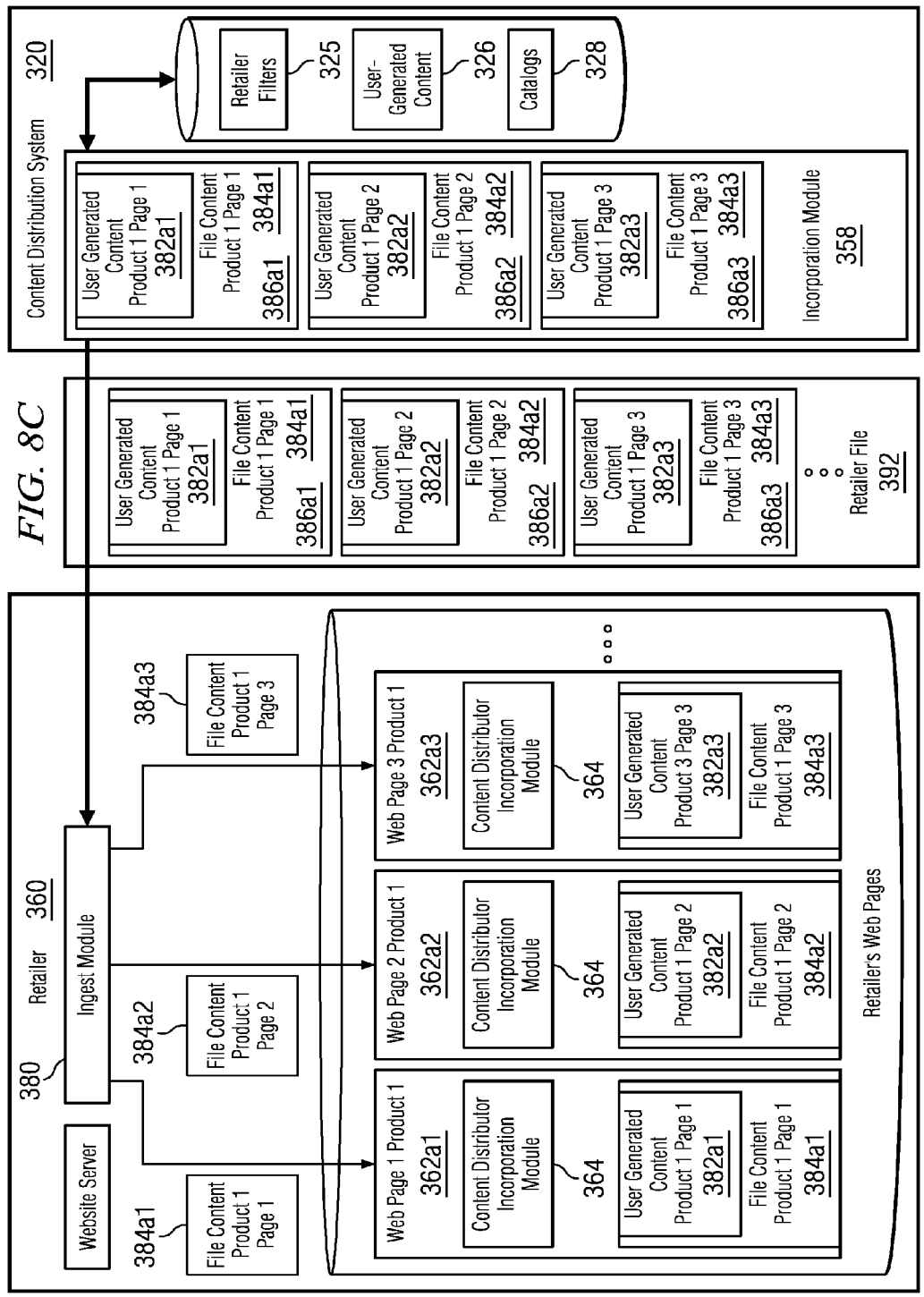
FIG. 8C is a block diagram of one embodiment of the inclusion of content.

Referring now to FIG. 8C, a graphical depiction of an example of one embodiment for providing user generated content to a retailer for inclusion in the source code of a set of retailer's web pages associated with a particular product is depicted. As discussed above, at some interval incorporation module 358 of content distribution system 320 may create retailer file 392 for a particular retailer 360. To create the retailer file 392 incorporation module 358 may determine a set of identifiers associated with the retailer 360 using the catalog 328 associated with that retailer 360.

Assume for purposes of this example that "Product 1" sold by retailer 360. Assume further that the retailer 360 has three pages associated with "Product 1." Thus, focusing only on the web pages associated with "Product 1" for the purposes of this example, identifiers for associated with "Product 1" and the associated set of web pages, (the initial web page "Page 1", the subsequent page "Page 2" and the last subsequent page "Page 3") are determined by incorporation module 358.

Using the identifier for "Product 1" and each of the set of web pages, appropriate user generated content 382 from user generated content 326 may be determined. This determination may be made using retailer filters 325 associated with the retailer 360 if any have been configured or other filters. This user generated content 382 is part of the file content 384 included in the page file 386 for an identifier and associated web page. Each of these page files 386 is included in the retailer file 392 in association with that identifier and the retailer file 392 is then sent to the retailer 360 (e.g. one or more computing devices associated with the retailer). Thus, in this case, there is a page file 386 for each of the set of web pages associated with "Product 1."

Focusing again on the set of pages associated with "Product 1" for purposes of this example, the retailer 360 may receive the retailer file 392 and process the retailer file 392 using the ingest module 380. This ingest module 380 processes the retailer file 392 to determine the file content 384 associated with each of the set of web pages 362 for "Product 1". The ingest module 380 may be further configured to incorporate the appropriate file content 384, including the user generated content 382, into each of the respective web pages 362. Thus, the source code of each web page 362 may include the user generated content 382 and other file content 384 provided by the content distribution system 320 in the retailer file 392. Accordingly, this file content 384 (including the user generated content 382) will be indexed in association with the respective web page 362 when that web page 362 is indexed by a search engine indexer.

Furthermore, a content distributor incorporation module 364 may be included in the retailer's web page 362, where the content distributor incorporation module 364 may include code such as JavaScript that is configured to, when executed by a browser rendering the web page 362 at a user's computer device, contact the content distribution system 320 and request user generated content associated with that page. Embodiments of such content distributor incorporation modules have been discussed in detail above and will additionally be discussed later herein.

With that in mind, attention is now directed to FIGS. 9A and 9B-9F which depict, respectively, a flow diagram and block diagrams of one embodiment for the accessing such a web page at a computer device. At step 410 a web page of the retailer's web site may be accessed. This web page may include both user generated content (or other file content) in the source code of the web page and the content distributor incorporation module. Such access may be from, for example, a user browsing a retailer's web or a search engine indexer as discussed above. This web page may be provided from the retailer (e.g. one or more computing devices that implement the web site of the retailer) to the accessing device (e.g. the user's browser at the user's computing device or the computing device executing the search engine indexer).

If code execution is not enabled at step 412 (for example, if the user has turned off the execution of JavaScript in his browser or the execution of such code is otherwise prevented or not attempted such as with a search engine indexer) the user generated content incorporated into the source code of the web page may be utilized at step 414. For example, if the web page is being accessed by a user at browser, the user generated content incorporated into the source code of the web page may be rendered by the user's browser and displayed to the user. If, however, the access to the web page is made by a search engine indexer the user generated content included in the source code of the web page will be processed by the search engine indexer such that it is indexed in conjunction with that web page.

Alternatively, if code execution is enabled at step 412 (which may be the case in the majority of accesses by users utilizing browsers) the content distributor incorporation module included in the web page may be executed at step 416. When the content distributor incorporation module is executed it may send a request for user generated content for the web page to the content distribution system at step 418. Such a request may comprise, for example, identifiers associated with the web page. The content distribution system may determine appropriate user generated content based on the received request at step 420, format the user generated content appropriately (e.g. by including additional markup language to format the display of that content specifically for that retailer, adding interactive elements, adding additional content to the user generated content, adding links or other elements, etc.) and, at step 422, return this user generated content to the content distributor incorporation module executing on the browser (or other program) from which the request was received.

It will be noted that in the determination of user generated content to return at step 420 one or more filters may be applied to the determined user generated content as discussed above with respect to FIG. 3A. Certain filters may be applied in the determination of appropriate user generated content at step 420. In particular, in one embodiment, one or more retailer filters may be applied to determine user-generated content for inclusion in the appropriate set of user-generated content for a page. The retailer filters may include an initial sort order, an initial amount, a subsequent sort order, a subsequent amount, or other filters. Another embodiment of a filter which may be utilized is a syndication delay filter as discussed above with respect to FIG. 10

When the user generated content is received by the content distributor incorporation module at step 424 the content distributor incorporation module may overwrite the user generated content included in the source code of the web page at step 426 such that the new user generated content received from the content distribution system is rendered by the browser and displayed to the user instead of the user generated content incorporated into the source code of the web page itself.

As discussed above, user generated content may be incorporated within the source code of the web page in a container defined using a <div> block with a particular identifier (e.g., <div id="bvrrcontainer">) where that identifier may be unique within that web page. Thus, to overwrite the user generated content included in the source code of the web page the content distributor incorporation module may be configured to overwrite everything within the container having that identifier with the user generated content received from the content distribution system.

It will be noted that there may be a period of time between when the web page is rendered by a browser and the time in which the content distributor incorporation module requests, receives and overwrites the user generated content included in the source of the web page with the newly received user generated content from the content distribution system. Thus, as all the source code of the web page may be rendered by the browser there may be a time interval in which the content included in the source code of the web page in the container with the identifier may be briefly displayed to the user before it is overwritten with the newly received content by the content distributor incorporation module.

To prevent such flashing of the included content, at least a portion of the rendered content of the container with the identifier may be hidden through the execution of a script or other code included in conjunction with the container (as discussed above). As this code may be executed when the web page is initially rendered it may prevent flashing of the content included in the source code of the web page during the time interval between initial rendering of the web page and the overwriting of this content with newly received content from the content distribution system. Such a script may serve to hide a portion, or all of, the rendered content included in the container, as discussed above.

Figure 9A:
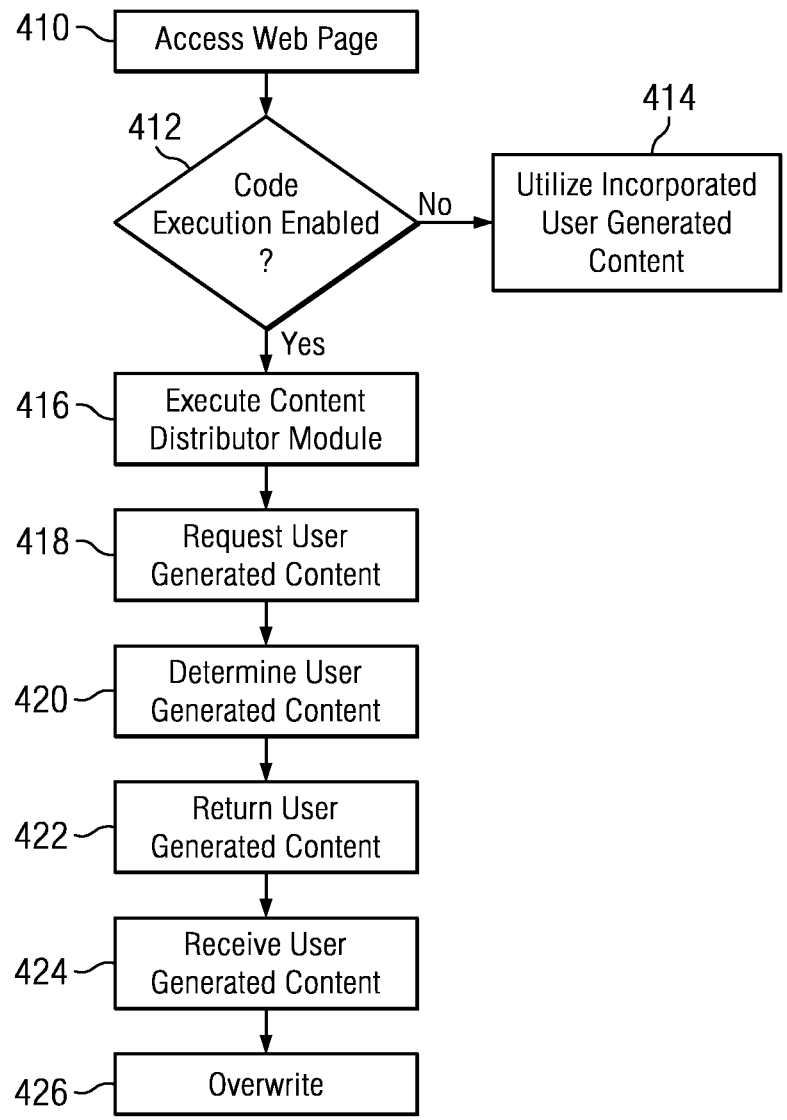
FIG. 9A is flow diagram of one embodiment of a method for utilizing content.
Figure 9B:
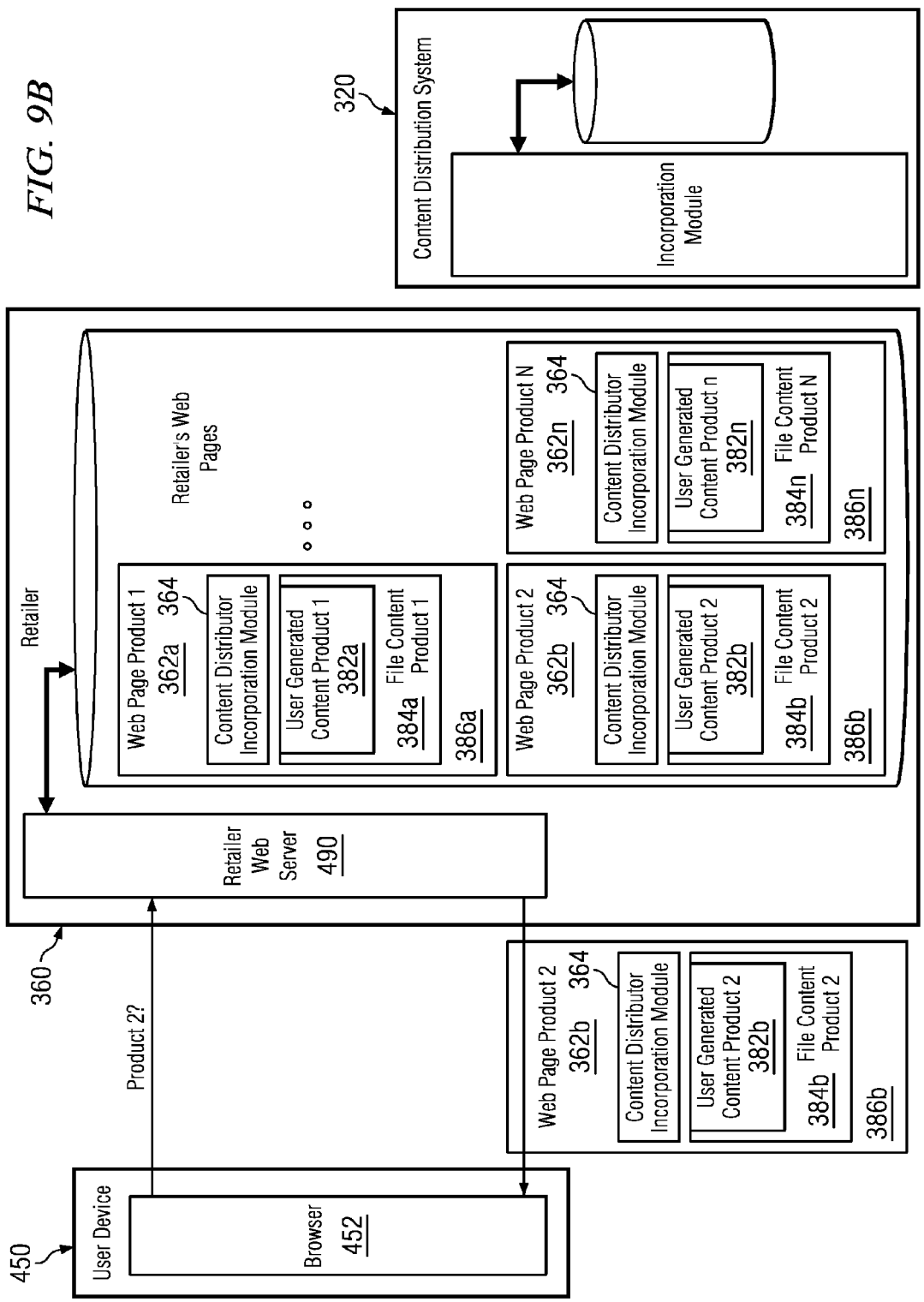

A graphical depiction of an embodiment of accessing a web page, such as those described above, at a computer device may be helpful. Referring initially to FIG. 9B, which continues with the above example depicted in FIG. 8B, a user at a user computing device 450 may utilize a browser 452 to request a web page associated with "product 2" from retailer 360. More specifically, the browser 452 may send a request to the retailer's web server 490 identifying the web page requested (for example, an HTTP GET or POST request or the like). The retailer web server 490 may obtain the requested web page 386b from the retailer's web pages and return the requested web page 386b associated with "product 2" to the browser 452 at the user computing device 450. The web page 386b associated with "product 2" comprises source code that includes the file content 384b associated with "product 2", including user generated content 382b associated with "product 2."

Figure 9C:
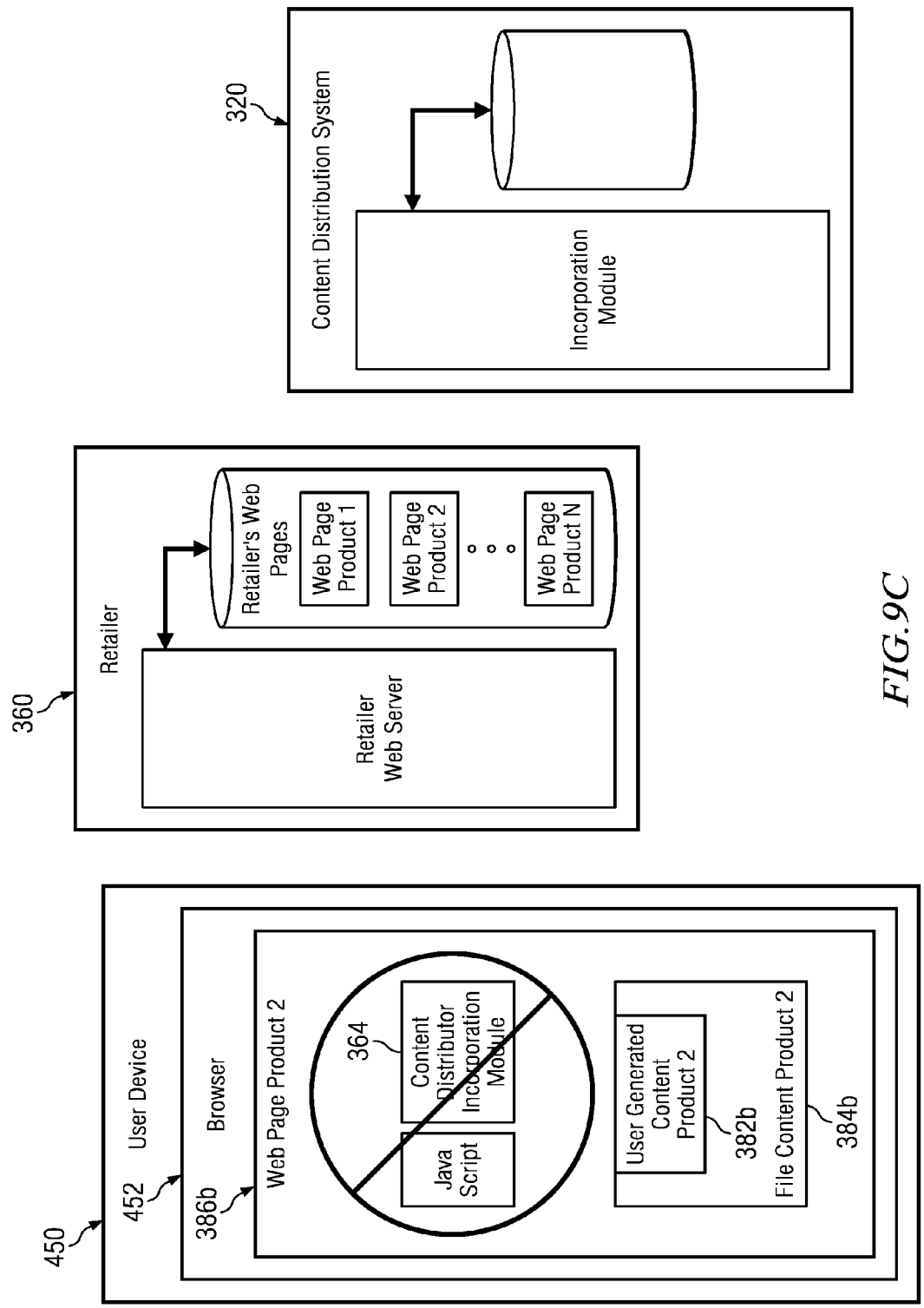
Figure 11A:
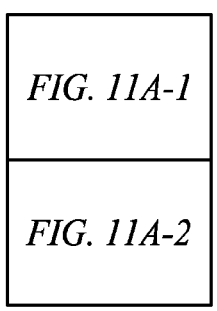
FIGS. 11A and 11B are examples of rendered web pages.

Assume for purposes of this example that the content distributor incorporation module 364 included with the web page 386b comprises JavaScript and that browser 452 at the user computing device 350 has JavaScript disabled for some reason. FIG. 9C graphically depicts the rendering of the example web page 386b in such a scenario. Here, as JavaScript may be disabled, content distributor software module 364 may not be executed. Additionally, any JavaScript code included in file content 384 may not be executed. Accordingly, file content 384b (including the user generated content 382b associated with "product 2") included in the source code of the web page 386b for "product 2" may be rendered and displayed to the user in conjunction with the rendering of the web page 386b for "product 2." FIG. 11A depicts an example of a rendered web page where file content included in the source code of the web page has been rendered.

Figure 9E:
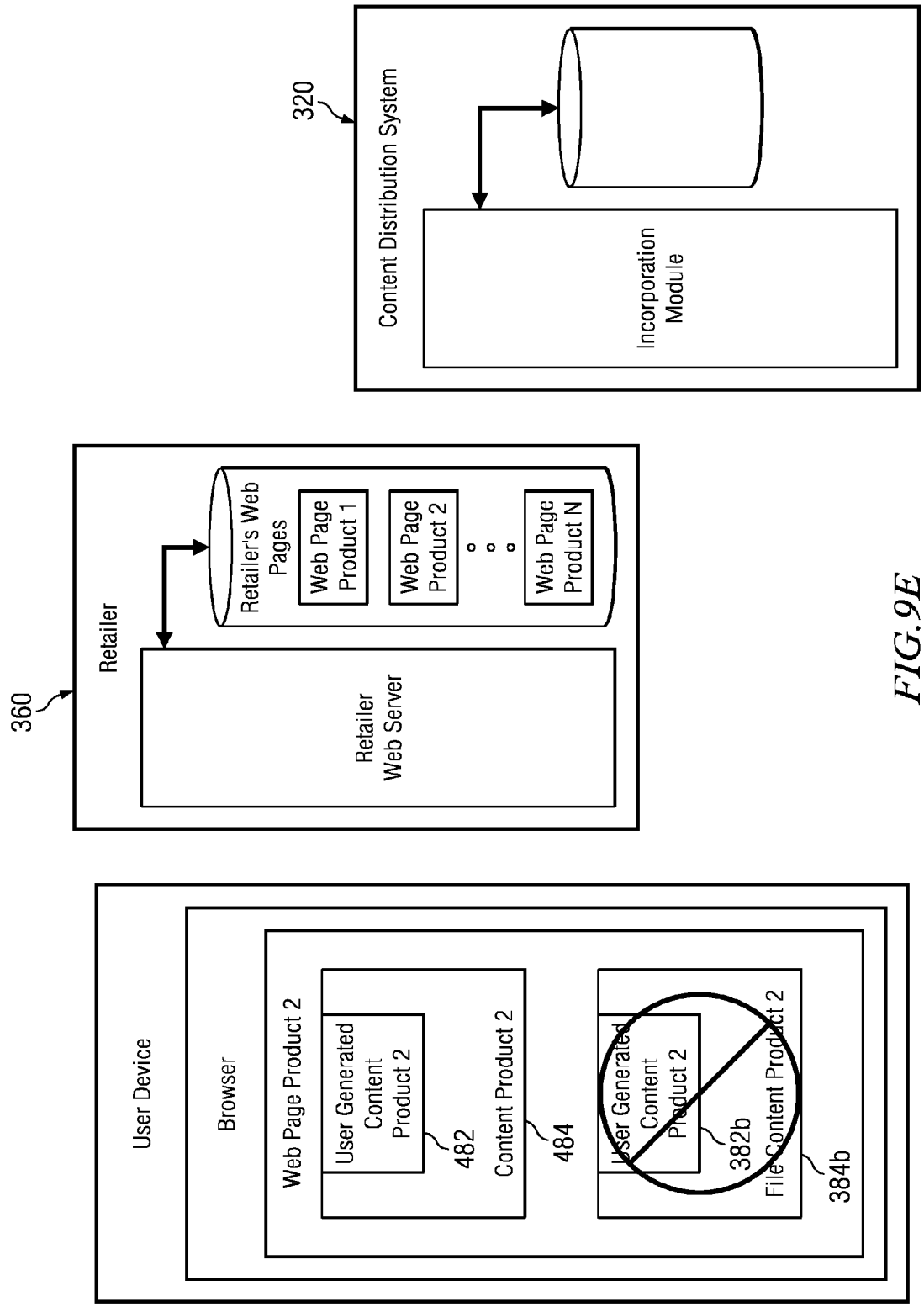

Referring back to FIG. 9B, assume again that that the content distributor incorporation module 364 included with the web page 386b comprises JavaScript but assume here that browser 452 at the user computing device 450 has JavaScript fully enabled. FIGS. 9D and 9E graphically depicts the rendering of the example web page 386b in such a scenario. Looking first at FIG. 9D, when browser 452 receives and renders the web page 386b during the course of rendering the content distributor incorporation module 364 may be executed by the browser 452. When executed, the content distributor incorporation module 364 may send a request to content distribution system 320 where the request includes a set of data. Such data may, for example, include an identifier associated with "product 2" associated with web page 386b or an identifier associated with web page 386b itself (other examples and uses of various types of data that may be included in such a request are discussed elsewhere herein).

The request may be received at content distribution system 320 where incorporation module 358 may use at least a portion of the set of data included in the request to determine content 484 to return in response to the request. The content 484 includes a set of user generated content 482 from user generated content 326 that is associated with "product 2." This content 484 is then returned to the content distributor incorporation module 364 executing in association with the rendering of web page 386b at the browser 452.

Figures 1, 11B:
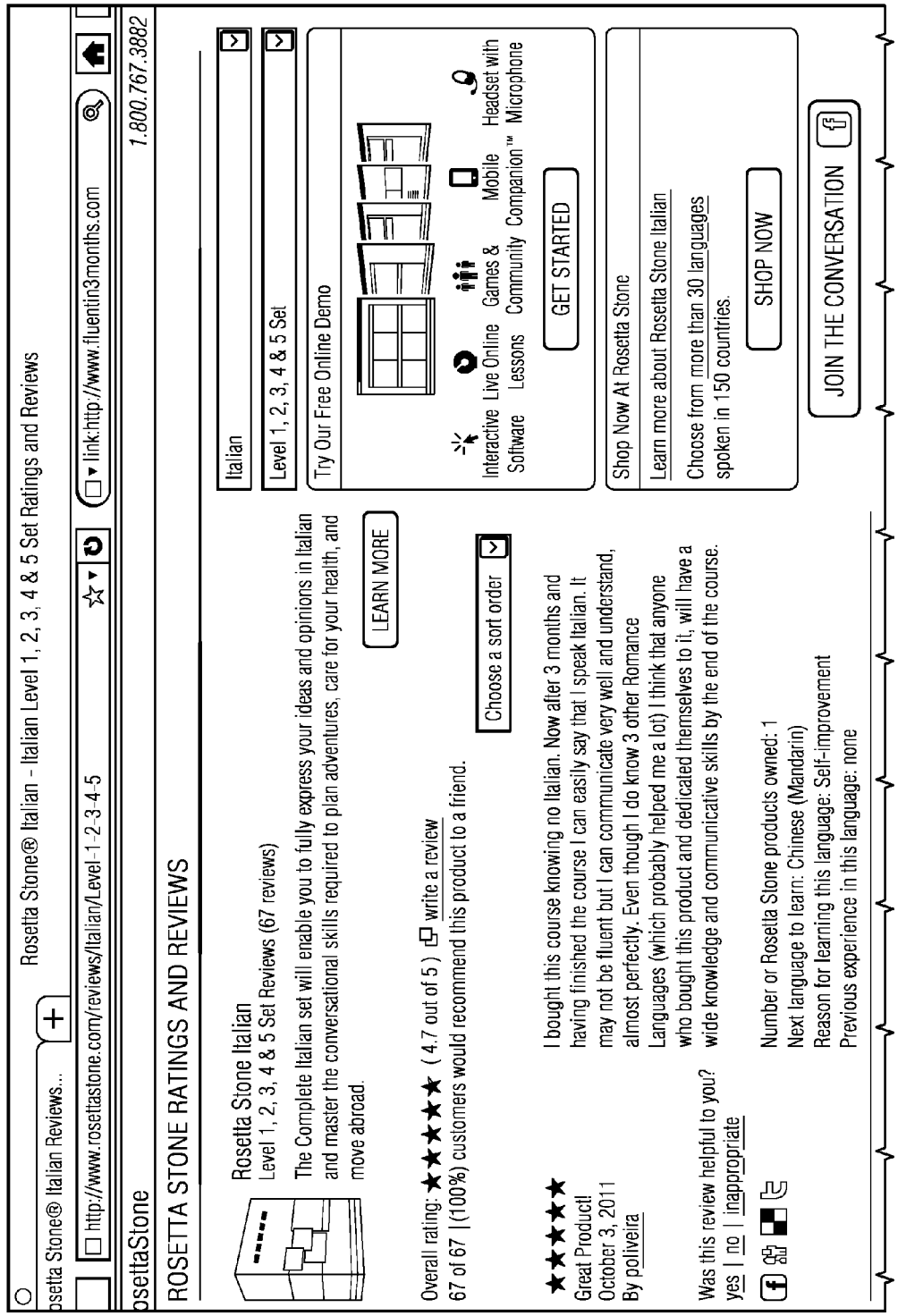

Moving on to FIG. 9E, when the content distributor incorporation module 364 receives content 484 from the content distribution system 320 it may overwrite the file content 384b included in the source code of the web page 386b with the newly received content 484. Thus, the newly received content 484, including the newly received user generated content 482 associated with "product 2", may be rendered and displayed to the user in conjunction with web page 386b instead of the user generated content 382b included in the source code of the web page 386b. FIG. 11B depicts an example of a rendered web page where content received from a content distribution system is rendered and displayed to the user in conjunction with the web page.

Another graphical depiction of an embodiment of accessing a web page, such as those described above, at a computer device may be helpful. FIG. 9F therefore continues with the above example depicted in FIG. 8C. Here a user at a user computing device 450 may utilize a browser 452 to request a subsequent web page (e.g. "page 2") of the set of web pages associated with "product 1" from retailer 360. More specifically, the browser 452 may send a request to the retailer's web server 490 identifying the web page (e.g. an identifier associated with the web page that is "page 2" of the set of webpages associated with "Product 1," etc.) requested (for example, an HTTP GET or POST request or the like). The retailer web server 490 may obtain the requested web page 386a2 from the retailer's web pages and return the first subsequent web page (e.g. "page 2") 386a2 associated with "product 1" to the browser 452 at the user computing device 450. The subsequent web page 386a2 associated with "product 1" comprises source code that includes the file content 384a2 associated with the first subsequent web page associated with "product 1", including user generated content 382a2 associated with the first subsequent web page associated with "product 1." Such a web page will be rendered by the browser substantially similarly to the description provided herein in conjunction with FIGS. 9A and 9C, 9D and 9E above.

As can be seen then, using embodiments presented herein user generated content may be exposed to a search engine indexer in conjunction with a web page while still providing a mechanism for incorporating the freshest user generated content using an architecture that can provide for substantially real time interactivity between a user and aspects of user generated content through a web page. It should be noted here that while certain embodiments of have been described with respect to certain particular tags (e.g. <noscript>, <div>) other embodiments may be equally effectively implemented with other tags (e.g. <iframe>) or other mechanisms utilized with markup languages to execute certain code (e.g. scripts or the like) or incorporate content. Furthermore, although certain embodiments presented herein have been described with respect to retailers or manufacturers, etc. it should be noted that substantially similar embodiments may be employed equally effectively with respect to sites operated by other or different entities.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method, comprising:
    receiving, by a content distribution system that includes at least one computer server, user generated content associated with a product or a category, wherein the user generated content is associated with a web site;
    dividing, by the content distribution system, the user generated content into a first portion and a second portion for incorporation into content displayed at a first and a second web page, respectively;
    providing to the first web page, from the content distribution system, the first portion of the user generated content and a link, wherein the link is selectable to navigate to the second web page; and
    in response to detecting navigation of the link, providing, from the content distribution system, the second portion of the user generated content to the second web page, wherein the providing of the second portion of the user generated content further comprises:
        based on a first ratio of the first portion of the user generated content relative to first total content displayed on the first web page, the content distribution system providing the second portion of the user generated content to the second web page such that a display of the second web page is indicative of a second ratio of the second portion of the user generated content relative to second total content displayed on the second web page, and wherein a difference in the first and second ratios alters at least one search indexing property of the second web page.

2. The method of claim 1, wherein the first web page and the second web page are part of the web site.

3. The method of claim 1, wherein the first portion of the user generated content is divided from the user generated content at least partially based on a determination by an operator of the web site.

4. The method of claim 1, further comprising:
    sorting, by the content distribution system, the first portion of the user generated content according to a first sort order.

5. The method of claim 1, further comprising:
    subsequent to dividing the user generated content into the first and second portions, the content distribution system sorting the second portion of the user generated content according to a particular sort order.

6. The method of claim 1, further comprising:
    receiving, by the content distribution system, additional user generated content, wherein the additional user generated content is associated with one or more additional web sites, and wherein the additional user generated content is associated with additional opinions of the product or category;
    selecting, by the content distribution system, an amount of the additional user generated content for incorporation into the first web page;
    providing, from the content distribution system, the selected amount of the additional user generated content to the first web page, wherein the selected amount of the additional user generated content is accessible by one or more search engines to index the first web page;
    receiving, by the content distribution system, a request from an application configured to display the first web page at a user computer, wherein the request is for content associated with the first web page; and
    in response to receiving the request, the content distribution system providing the selected amount of the additional user generated content to the application, wherein a display of the first web page includes a display of the selected amount of the additional user generated content, without a display of the first portion of the user generated content.

7. The method of claim 6, wherein an amount of the first portion of the user generated content and the selected amount of the additional user generated content are a same amount.

8. A computer system, comprising:
    a processor; and
    a non-transitory memory having stored therein instructions that are executable by the processor to cause the computer system to perform operations comprising:
    receiving user generated content associated with a product or a category, wherein the user generated content is associated with a web site;
    dividing the user generated content into a first portion and a second portion for incorporation into content displayed at a first and a second web page, respectively;
    providing, to the first web page, the first portion of the user generated content and a link, wherein the link is selectable to navigate to the second web page link; and
    in response to detecting navigation of the link, providing the second portion of the user generated content to the second web page, wherein the operations of providing the second portion of the user generated content to the second web page further comprise:
        based on a first ratio of the first portion of the user generated content relative to first total content displayed on the first web page, providing the second portion of the user generated content to the second web page such that a display of the second web page is indicative of a second ratio of the second portion of the user generated content relative to second total content displayed on the second web page, and wherein a difference in the first and second ratios alters at least one search indexing property of the second web page.

9. The computer system of claim 8, wherein the first web page and the second web page are part of the web site.

10. The computer system of claim 8, wherein the operations further comprise:
prior to dividing the user generated content, sorting the user generated content according to a first sort order.

11. The computer system of claim 8, wherein the user generated content includes one or more of the following: a review, a rating, or a comment.

12. The computer system of claim 8, wherein the operations further comprise:
receiving additional user generated content, wherein the additional user generated content is associated with one or more additional web sites, and wherein the additional user generated content is associated with additional opinions of the product or category;
selecting an amount of the additional user generated content for incorporation into the first web page;
providing the selected amount of the additional user generated content to the first web page, wherein the selected amount of the additional user generated content is accessible by one or more search engines to index the first web page;
receiving a request from an application configured to display the first web page at a user computer, wherein the request is for content associated with the first web page; and
in response to receiving the request, providing the selected amount of the additional user generated content to the application, wherein a display of the first web page includes a display of the selected amount of the additional user generated content, without a display of the first portion of the user generated content.

13. The computer system of claim 12, wherein an amount of the first portion of the user generated content and the selected amount of the additional user generated content are a same amount.

14. A non-transitory computer readable medium comprising instructions that are executable by a computing device to cause the computing device to perform operations comprising:
receiving user generated content associated with a product or a category, wherein the user generated content is associated with a web site;
dividing the user generated content into a first portion and a second portion for incorporation into content displayed at a first and a second web page, respectively;
providing to the first web page, the first portion of the user generated content and a link, wherein the link is selectable to navigate to the second web page; and
in response to detecting navigation of the link, providing the second portion of the user generated content to the second web page, wherein the operations of providing of the second portion of the user generated content further comprise:
based on a first ratio of the first portion of the user generated content relative to first total content displayed on the first web page, providing the second portion of the user generated content to the second web page such that a display of the second web page is indicative of a second ratio of the second portion of the user generated content to second total content displayed on the second web page, and wherein a difference in the first and second ratios alters at least one search indexing property of the second web page.

15. The non-transitory computer readable medium of claim 14, wherein the first web page and the second web page are configured to be administered by a common operation.

16. The non-transitory computer readable medium of claim 14, wherein the operations of dividing from the user generated content the first portion and the second portion are at least partially based on a determination of an operator of the web site.

17. The non-transitory computer readable medium of claim 14, wherein the operations of dividing the user generated content into the first portion and the second portion include sorting supporting content included in the user generated content according to a first sort order.

18. The non-transitory computer readable medium of claim 14, wherein the user generated content includes one or more of the following: a review, a rating, or a comment.

19. The non-transitory computer readable medium of claim 14, wherein the operations further comprise:
receiving additional user generated content, wherein the additional user generated content is associated with one or more additional web sites, and wherein the additional user generated content is associated with additional opinions of the product or category;
selecting an amount of the additional user generated content for incorporation into the first web page;
providing the selected amount of the additional user generated content to the first web page, wherein the selected amount of the additional user generated content is accessible by one or more search engines to index the first web page; and
receiving a request from an application configured to display the first web page at a user computer, wherein the request is for content associated with the first web page; and
in response to receiving the request, providing the selected amount of the additional user generated content to the application, wherein a display of the first web page includes a display of the selected amount of the additional user generated content, without a display of the first portion of the user generated content.

20. The non-transitory computer readable medium of claim 19, wherein an amount of the first portion of the user generated content and the selected amount of the additional user generated content are a same amount.

21. The method of claim 1, wherein the first total content displayed on the first web page includes supporting content and descriptive content, and wherein the descriptive content is indicative of a description of the product or the category.

* * * * *